United States Patent
Tanaka et al.

(10) Patent No.: US 10,596,813 B2
(45) Date of Patent: Mar. 24, 2020

(54) LIQUID DISCHARGE APPARATUS AND LIQUID DISCHARGE METHOD

(71) Applicants: Hiroki Tanaka, Kanagawa (JP); Ryosuke Takeuchi, Kanagawa (JP); Takeshi Shikama, Kanagawa (JP)

(72) Inventors: Hiroki Tanaka, Kanagawa (JP); Ryosuke Takeuchi, Kanagawa (JP); Takeshi Shikama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/273,249

(22) Filed: Feb. 12, 2019

(65) Prior Publication Data
US 2019/0283408 A1 Sep. 19, 2019

(30) Foreign Application Priority Data

Mar. 14, 2018 (JP) .................................. 2018-047358
Jan. 23, 2019 (JP) .................................. 2019-009296

(51) Int. Cl.
*B41J 2/045* (2006.01)
*B41J 3/36* (2006.01)
*G01C 19/5656* (2012.01)
*G06F 3/03* (2006.01)

(52) U.S. Cl.
CPC ............ *B41J 2/04586* (2013.01); *B41J 3/36* (2013.01); *G01C 19/5656* (2013.01); *G06F 3/0304* (2013.01)

(58) Field of Classification Search
CPC ........ B41J 2/04586; B41J 3/36; B41J 3/4073; G01C 19/5656; G06F 3/0304
See application file for complete search history.

(56) References Cited

U.S. PATENT DOCUMENTS 8,092,006 B2 * 1/2012 Brown ..................... B41J 3/36
347/109

FOREIGN PATENT DOCUMENTS

| JP | 63-196264 | 12/1988 |
| JP | 5-042679 | 2/1993 |
| JP | 2016-007775 | 1/2016 |
| JP | 2016-010969 | 1/2016 |
| JP | 2017-170634 A | 9/2017 |

OTHER PUBLICATIONS

European Office Action dated Jul. 29, 2019.

* cited by examiner

*Primary Examiner* — Thinh H Nguyen
(74) *Attorney, Agent, or Firm* — Harness, Dickey & Pierce, P.L.C.

(57) ABSTRACT

A liquid discharge apparatus includes a head configured to discharge liquid to print an image on a recording medium according to image data while the liquid discharge apparatus is moved; a sensor configured to detect movement of the liquid discharge apparatus in a predetermined period and output movement information including at least one of a movement amount and an angular velocity of the liquid discharge apparatus; a heater configured to heat the head; a temperature sensor configured to detect a temperature of the head; and circuitry. The circuitry is configured to instruct liquid discharge from the head based on the image data and the movement information from the sensor, detect floating of the liquid discharge apparatus based on a detection result generated by the sensor, and control heating of the head based on a result of detection of the floating.

12 Claims, 23 Drawing Sheets

ROTATION AXIS

CORIOLIS FORCE Fcor $\vec{F}_{cor} = -2m\vec{\Omega}_{ext} \times \vec{V}$ $\Omega_{ext}$

V

LAST NOZZLE $(X_E, Y_E)$

TOP NOZZLE $(X_S, Y_S)$

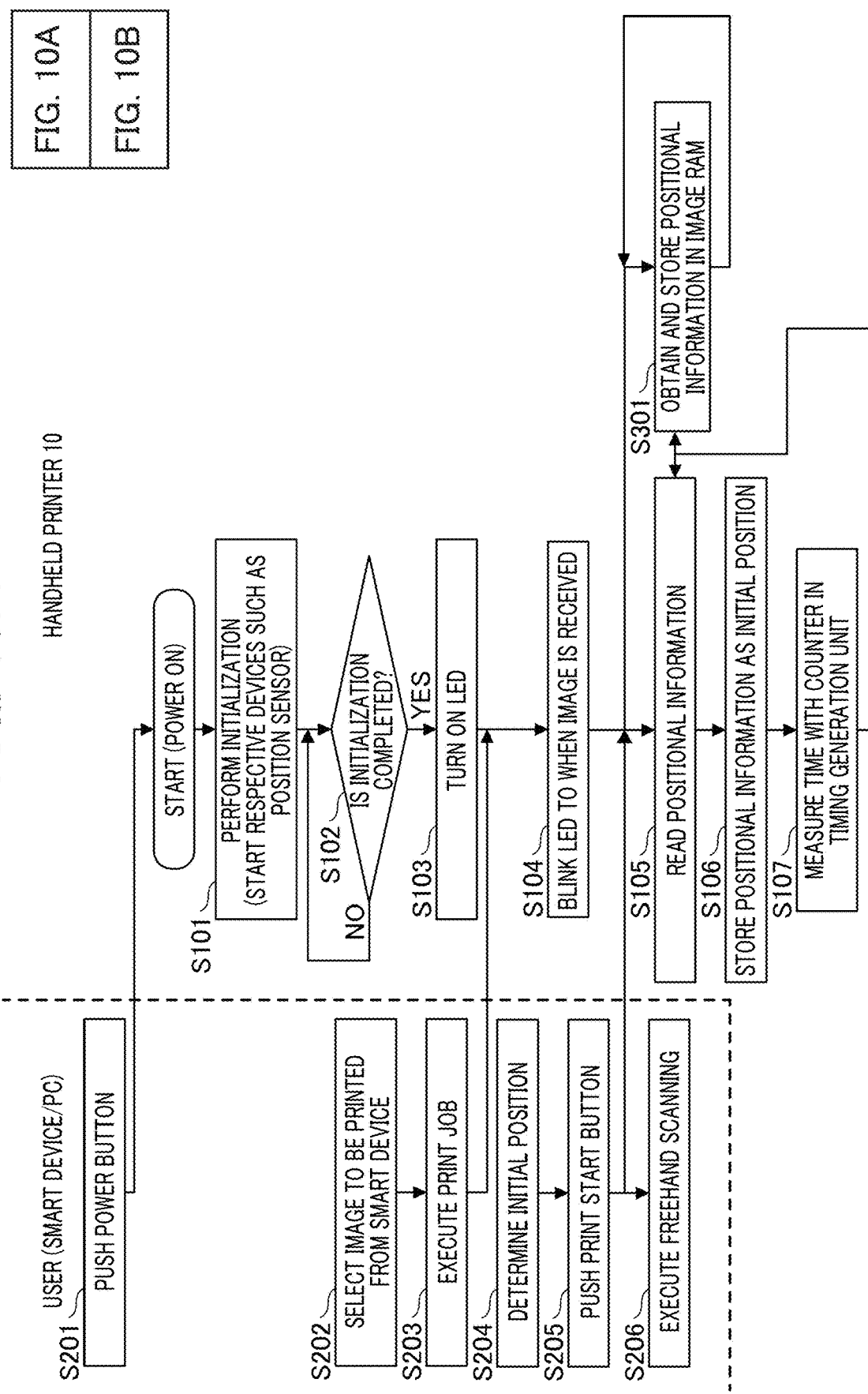

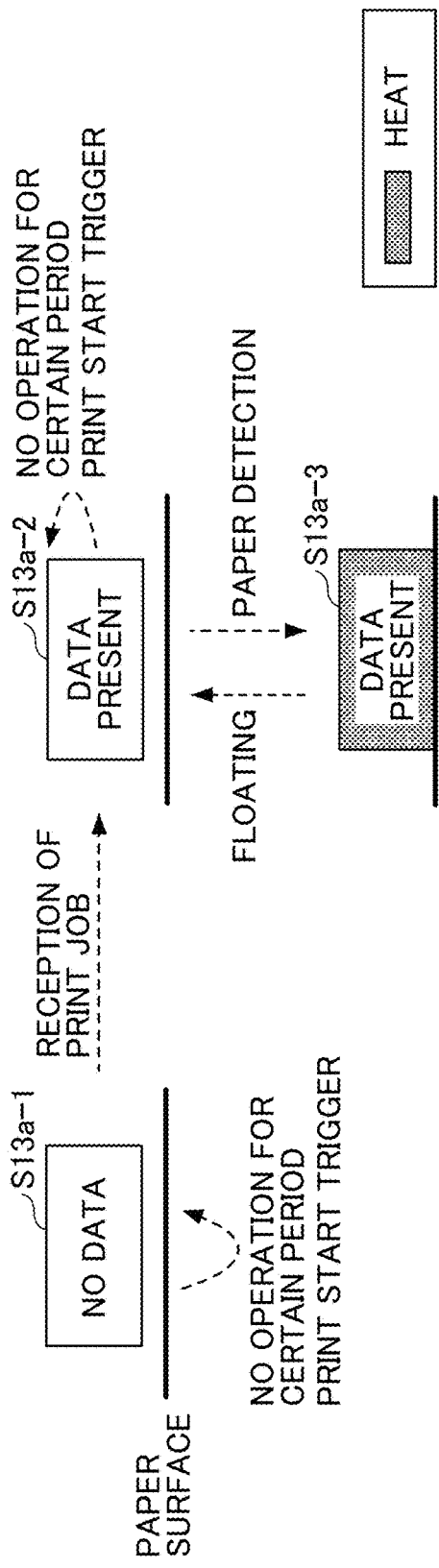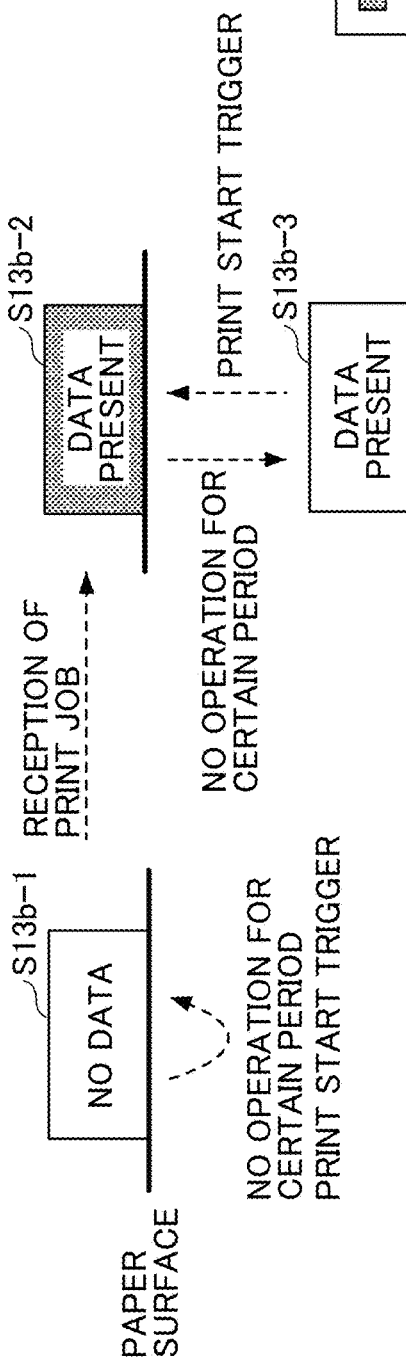

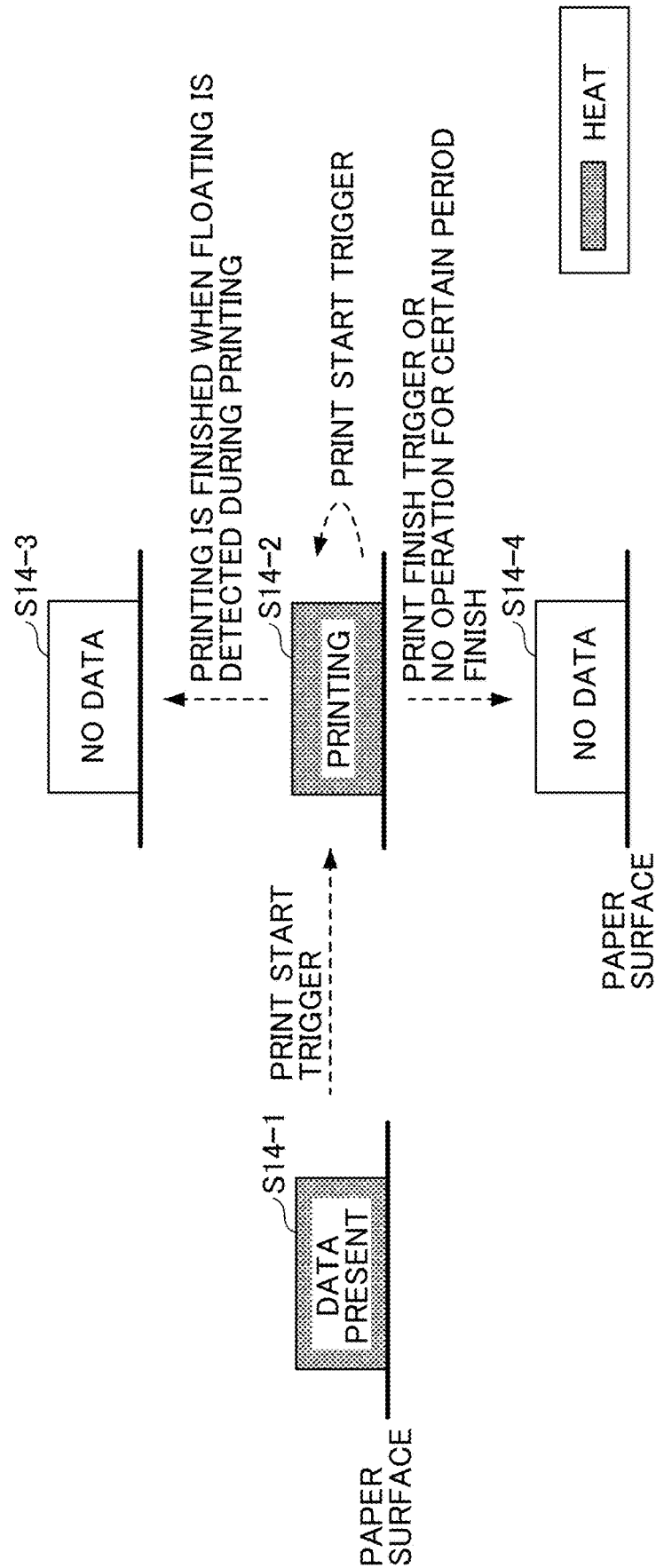

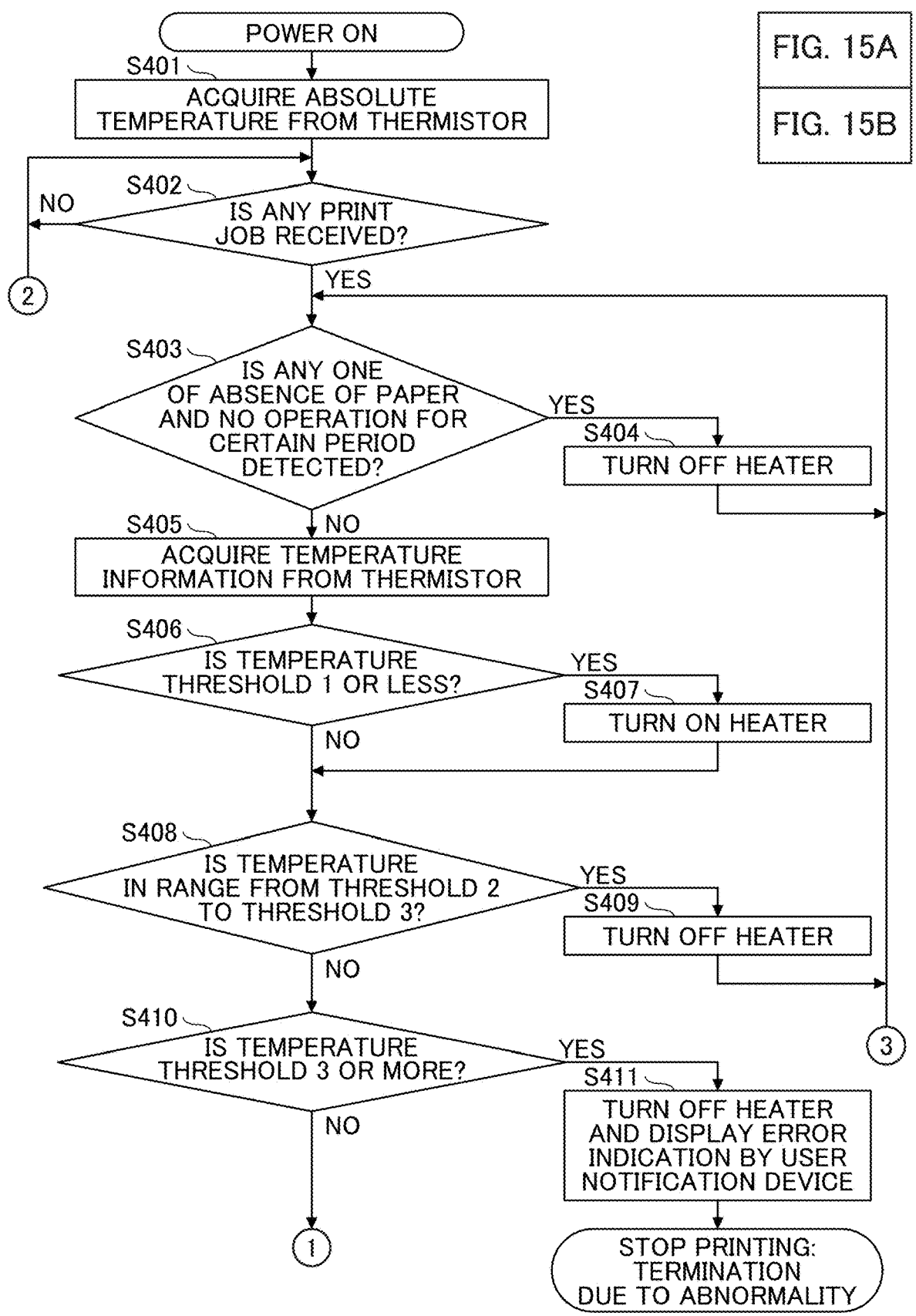

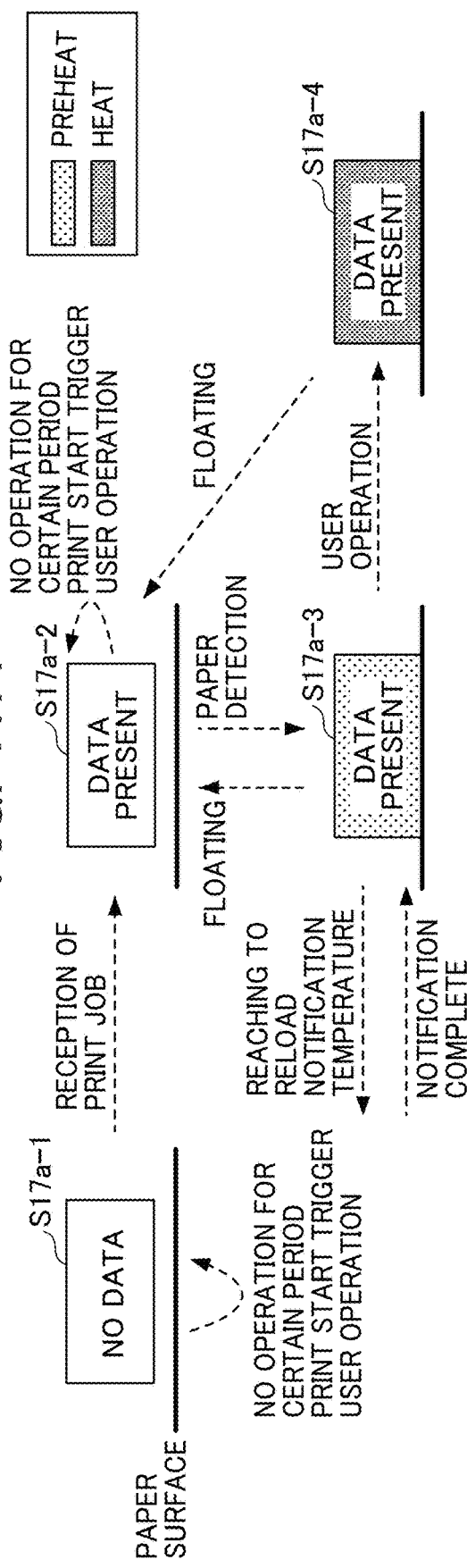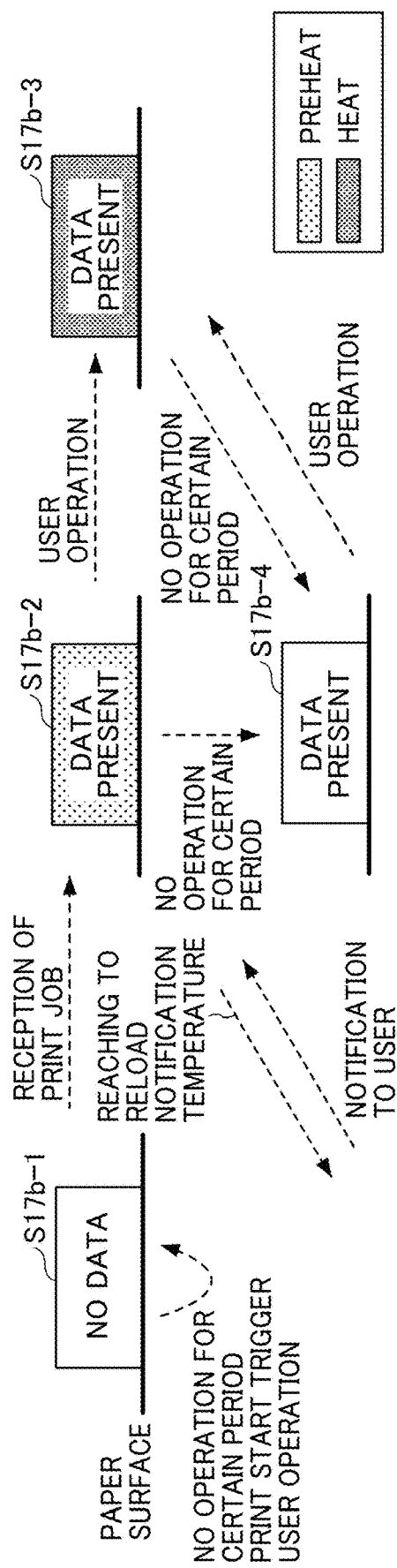

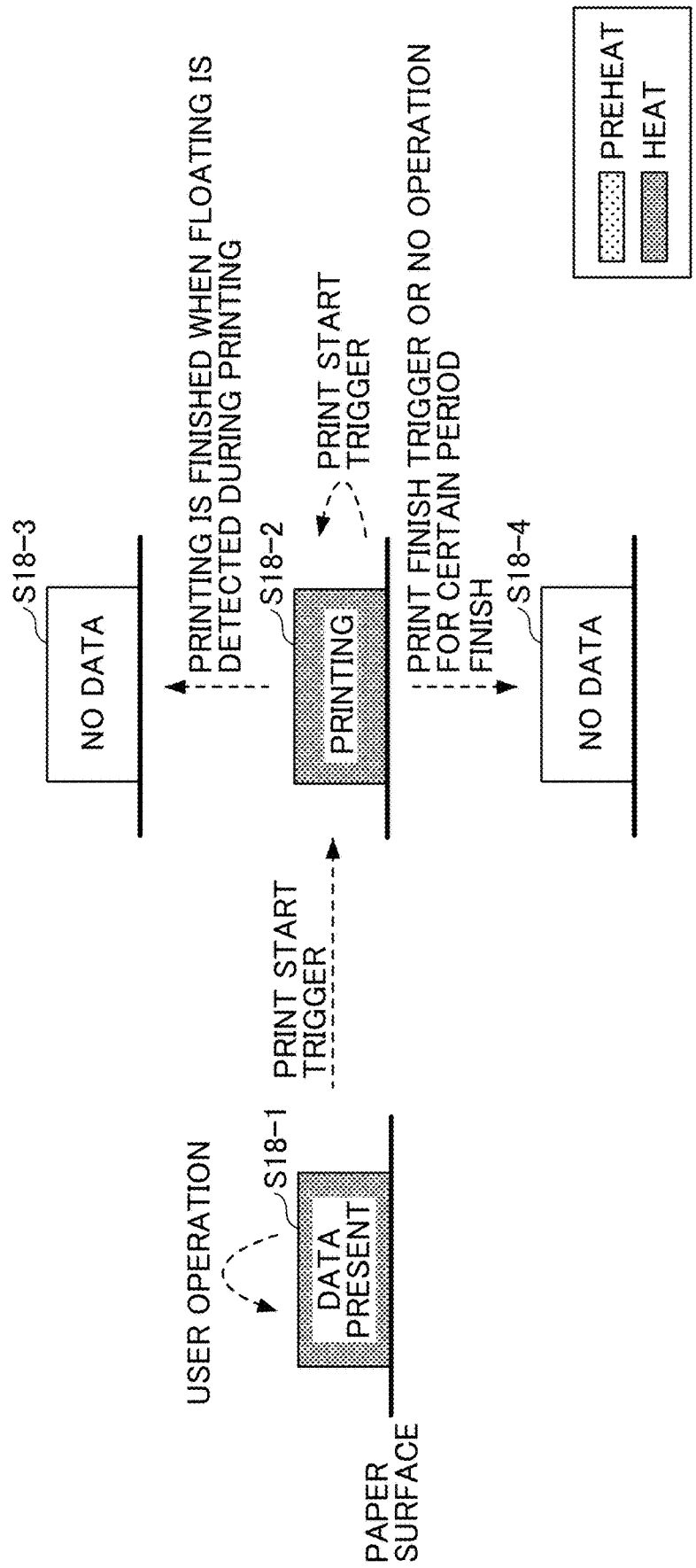

| FIG. 19A |
| FIG. 19B |

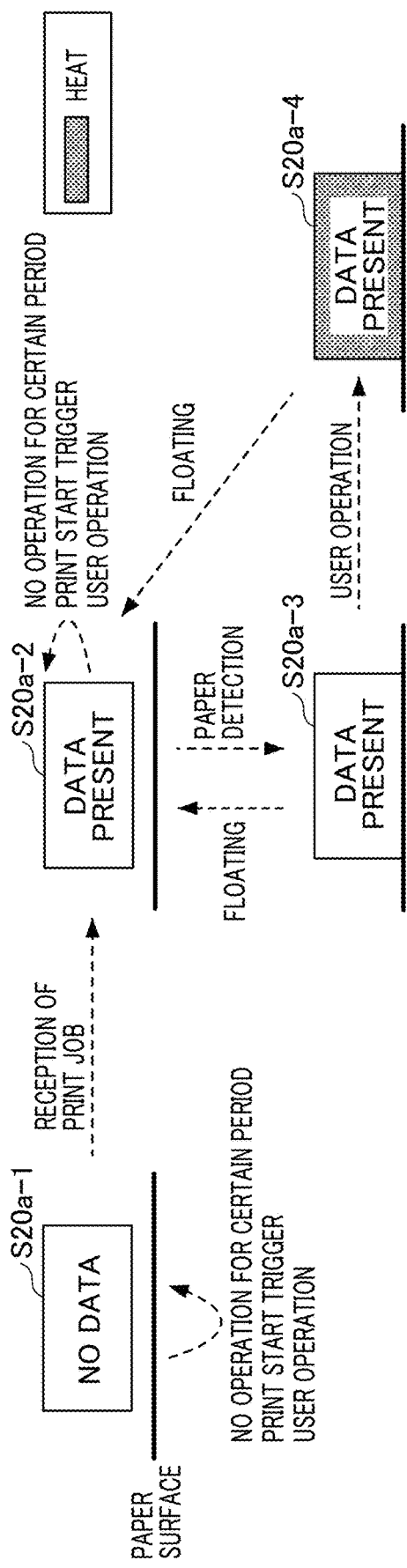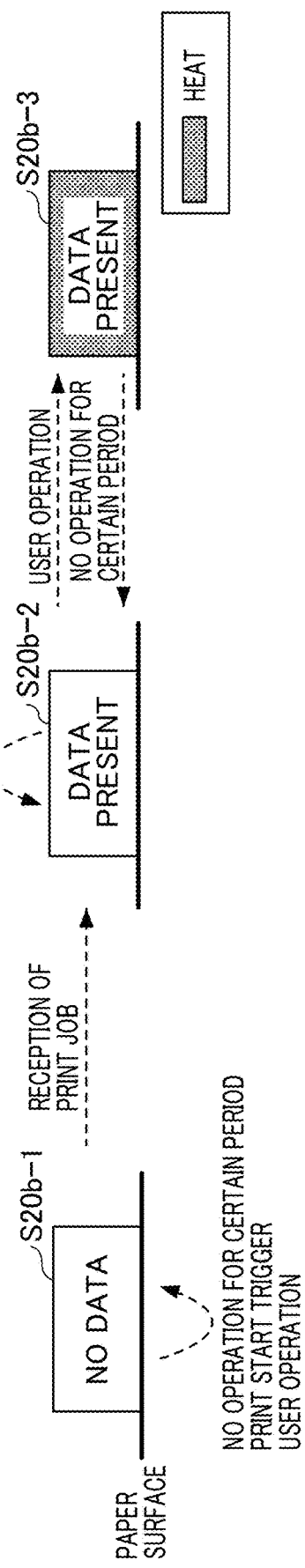

LIQUID DISCHARGE APPARATUS AND LIQUID DISCHARGE METHOD

CROSS-REFERENCE TO RELATED APPLICATIONS

This patent application is based on and claims priority pursuant to 35 U.S.C. § 119(a) to Japanese Patent Application Nos. 2018-047358 filed on Mar. 14, 2018 and 2019-009296 filed on Jan. 23, 2019, in the Japan Patent Office, the entire disclosure of each of which is hereby incorporated by reference herein.

BACKGROUND

Technical Field

The present disclosure relates to a liquid discharge apparatus, a liquid discharge method, and a recording medium.

Description of the Related Art

In recent years, as laptop computers (e.g., personal computers) become compact and smart devices have been rapidly spread, compactness and portability of printers are strongly desired. In such a trend, already known are "handheld printers", in which a sheet conveyance mechanism is omitted. While a user moves with a hand the handheld printer to scan a sheet, ink is applied onto the sheet.

On a bottom face of the handheld printer, a sensor is disposed to detect a nozzle position during scanning. In the case of printing by the handheld printer moved freely (i.e., freehand scanning), the sensor and a nozzle to discharge ink should be located above a recording medium. To calculate the exact position of the nozzle and control printing in printing, there is a method in which whether or not an ink droplet is discharged is determined for each nozzle, based on the position of each nozzle and the position of each image element in a case where image data of a predetermined area is printed on a recording medium.

SUMMARY

According to an embodiment of this disclosure provides a liquid discharge apparatus that discharges liquid onto a recording medium according to image data while being moved by a user. The liquid discharge apparatus includes a head configured to discharge liquid to print an image on the recording medium, a sensor configured to detect movement of the liquid discharge apparatus in a predetermined period and output movement information of the liquid discharge apparatus, a heater configured to heat the head, and a temperature sensor configured to detect a temperature of the head. The movement information includes at least one of a movement amount and an angular velocity of the liquid discharge apparatus. The liquid discharge apparatus further includes circuitry configured to instruct liquid discharge from the head based on the image data and the movement information from the sensor, detect floating of the liquid discharge apparatus based on a detection result generated by the sensor, and control heating of the head based on a result of detection of the floating.

Another embodiment provides a liquid discharge apparatus that discharges liquid onto a recording medium according to image data while being moved by a user. The liquid discharge apparatus includes the head, the sensor, the heater, and the temperature sensor described above. The liquid discharge apparatus further includes circuitry configured to instruct liquid discharge from the head based on the image data and the movement information from the sensor, detect, based on the movement information from the sensor, a user operation and an occurrence of standby time in which user operation is not performed for a predetermined period, and control heating of the head based on a detection of the user operation and the occurrence of standby time.

Yet another embodiment provides a liquid discharge method executed by a liquid discharge apparatus. The method includes discharging liquid, with a head, onto the recording medium; and detecting, with a sensor, movement of the liquid discharge apparatus in a predetermined period to output movement information of the liquid discharge apparatus.

The movement information includes at least one of a movement amount and an angular velocity. The method further includes heating the head, detecting a temperature of the head, instructing liquid discharge based on the image data and the movement information, determining floating of the liquid discharge apparatus based on a detection result generated by the sensor, and controlling the heating of the head based on a result of the detecting floating.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 10A and 10B (FIG. 10) illustrate a flowchart illustrating exemplary print processing by the handheld printer according to one embodiment;

FIGS. 13A and 13B are diagrams illustrating state transition relating to heater control from before reception of a print job, according to one embodiment;

FIG. 14 is a diagram illustrating state transition relating to heater control from a state in which a print job is received according to one embodiment;

FIGS. 15A and 15B (FIG. 15) is a flowchart illustrating exemplary heater control according to one embodiment;

FIGS. 17A and 17B are diagrams illustrating state transition relating to heater and preheater control from before reception of a print job, according to one embodiment;

FIG. 18 is a diagram illustrating state transition relating to heater and preheater control from a state in which a print job is received, according to one embodiment;

FIGS. 20A and 20B are diagrams illustrating state transition relating to heater control from before reception of a print job, according to one embodiment, in which user operation is used as a trigger.

Figure 1:
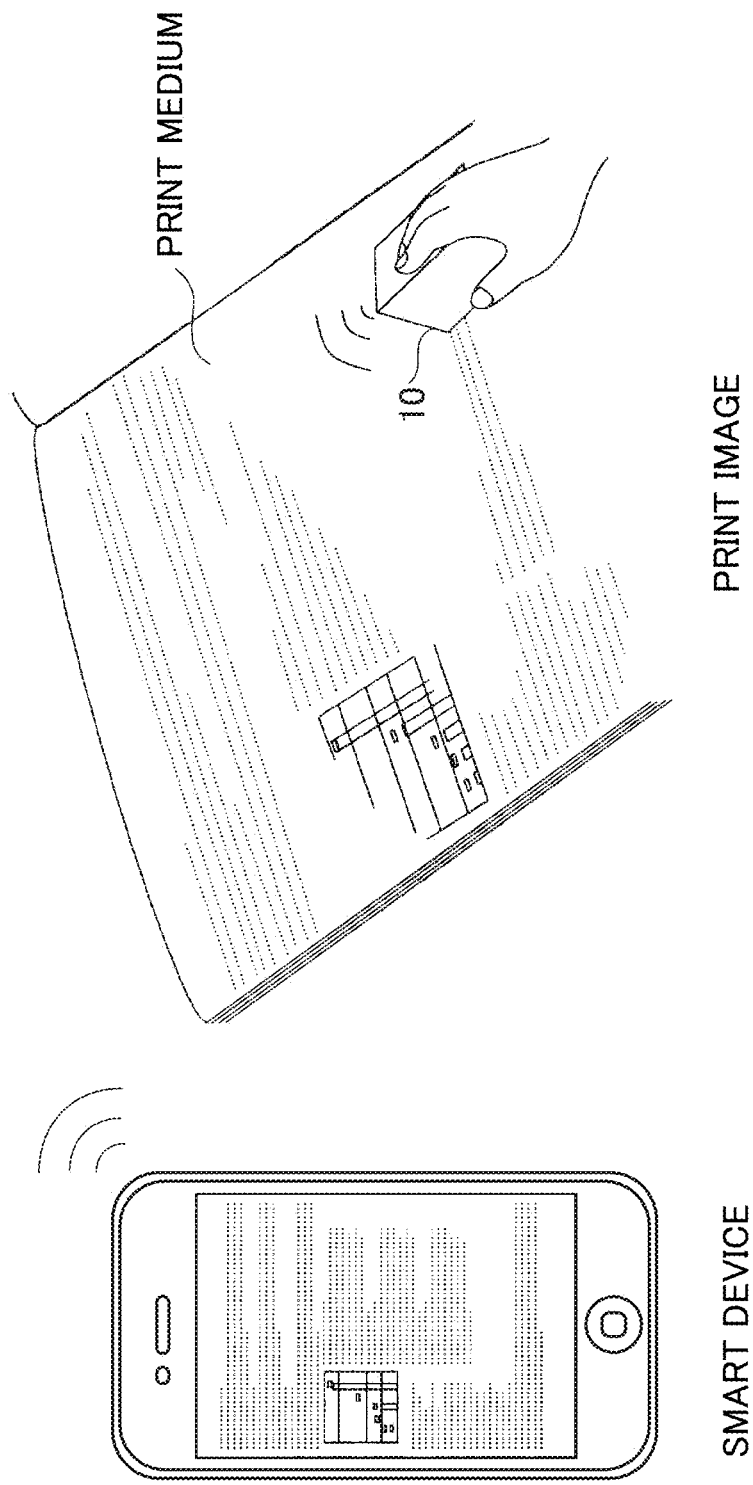
FIG. 1 is a diagram illustrating an example of printing using a handheld printer according to embodiments of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, a liquid discharge apparatus according to an embodiment of this disclosure is described. As used herein, the singular forms "a", "an", and "the" are intended to include the plural forms as well, unless the context clearly indicates otherwise.

FIG. 1 is a diagram illustrating an example of printing using a handheld printer 10 according to embodiments of the present disclosure. The handheld printer 10 receives image data from, for example, an image input device 100 (or an image data output device) such as a smart device or a personal computer (PC). Subsequently, as a user freely moves the handheld printer 10 two-dimensionally on a recording medium (e.g., a paper sheet), that is, scans the recording medium freehand with the handheld printer 10, the handheld printer 10 can form an image according to the image data. The recording medium is, for example, a sheet of a notebook or a regular size paper sheet.

As will be described later, the handheld printer 10 includes a navigation sensor 30 and a gyro sensor 20 to detect a position. The handheld printer 10 is configured to discharge the ink of the color to be applied to a target discharge position when the handheld printer 10 reaches the target discharge position. The portion to which the ink has already been applied is masked and becomes not an object of ink discharge. Accordingly, the user can move the handheld printer 10 freely with a hand in any direction on the recording medium to form an image.

Figure 2:
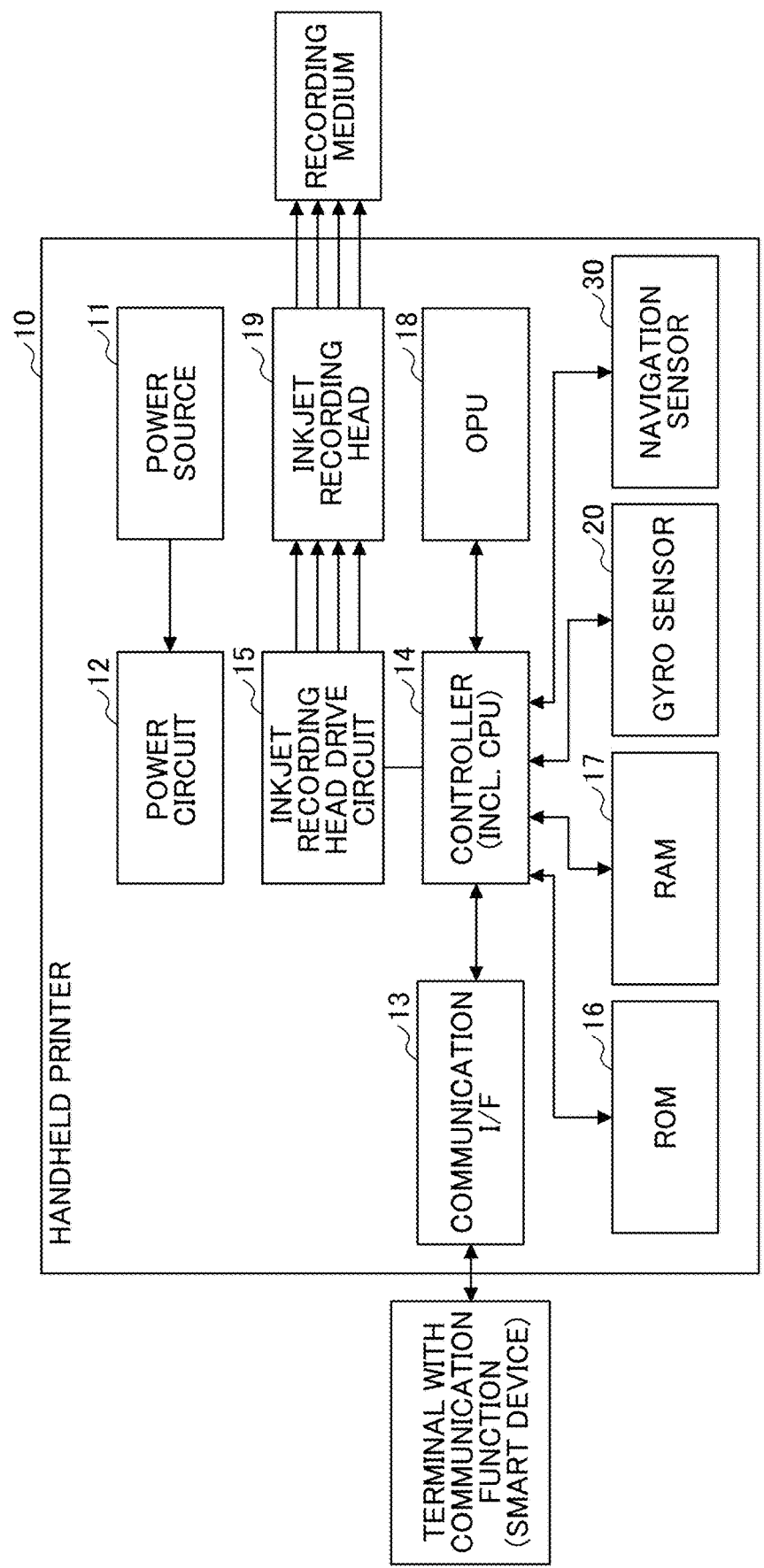
FIG. 2 is a block diagram illustrating a hardware structure of the handheld printer illustrated in FIG. 1.

FIG. 2 is a block diagram illustrating a hardware structure of the handheld printer 10 according to the present embodiment. The handheld printer 10 is an example of an image forming apparatus that forms an image on a recording medium and an example of a liquid discharge apparatus. The handheld printer 10 includes a power supply 11, a power circuit 12, a communication interface (I/F) 13, a controller 14, an inkjet recording head drive circuit 15, a read only memory (ROM) 16, a random access memory (RAM) 17, an operation panel unit (OPU) 18, an inkjet recording head 19, the gyro sensor 20, and the navigation sensor 30.

As the power supply 11, a battery is mainly used. A solar battery, an alternating-current (AC) commercial power supply, a fuel cell, or the like may be used. The power circuit 12 distributes the power supplied by the power supply 11 to each part of the handheld printer 10. Further, the power circuit 12 steps down or up the voltage of the power supply 11 to a voltage suitable for each part. When the power supply 11 is a rechargeable battery, the power circuit 12 detects the connection of, for example, an AC power supply and connects the AC power supply to a charging circuit of the battery to charge the power supply 11.

The communication I/F 13 receives image data from the image input device 100 such as a personal computer (PC or client computer) or a smart device. The communication I/F 13 supports communication standards such as wireless local area network (LAN), Bluetooth (registered trademark), near field communication (NFC), infrared communication, and third generation (3G) or long term evolution (LTE), which are communication schemes for mobile phones. In addition to such wireless communication, the communication I/F 13 can be a communication device compatible with wired communication employing a wired LAN, a universal serial bus (USB) cable, or the like.

The controller 14 includes a wired logic circuit included in a central processing unit (CPU) 101, an application specific integrated circuit (ASIC), a field-programmable gate array (FPGA), and the like and controls the entire handheld printer 10. For example, the controller 14 determines the position of each nozzle of the inkjet recording head 19 based on a movement amount and an angular velocity detected by the navigation sensor 30 and the angular velocity detected by the gyro sensor 20 so that the ink is discharged according to the position, thereby forming an image. Further, the controller 14 controls a head module 190 (illustrated in FIG. 9) including the inkjet recording head drive circuit 15 and the inkjet recording head 19, to control a heater circuit 204 including a heater 203H (illustrated in FIG. 9). The controller 14 and the head module 190 are described in further detail later.

The inkjet recording head drive circuit 15 generates a drive waveform for driving the inkjet recording head 19 using the drive waveform data supplied from the controller 14. The inkjet recording head drive circuit 15 can generate a drive waveform corresponding to the size of ink droplet and the like.

The ROM 16 includes a read only memory (ROM) to store firmware for hardware control of the handheld printer 10, drive waveform data for the inkjet recording head 19, and other data necessary for initial setting of the handheld printer 10. The ROM can be any one, or a combination of two or more of, a mask ROM, a programmable ROM (PROM), an electrically erasable ROM (EEPROM), a flash memory, a memory card that is an external storage medium, and the like.

The controller 14 uses the RAM 17 as a work memory when executing the firmware. The RAM 17 stores the image data received by the communication I/F 13 and is used to execute the expanded firmware. The RAM can be any one or a combination of two or more of a dynamic RAM (DRAM), a static RAM (SRAM), a synchronous DRAM (SDRAM), and the like.

The OPU 18 includes a light emitting diode (LED) to indicate a status of the handheld printer 10, a liquid crystal display, a buzzer, a touch panel for the user to instruct the handheld printer 10 to form an image, and the like. The OPU 18 can further have a voice input function.

The inkjet recording head 19 is a head to discharge ink and includes a plurality of nozzles. In FIG. 2, the inkjet recording head 19 is configured to discharge inks of four colors, namely, cyan (C), magenta (M), yellow (YL), and black (B). Alternatively, the inkjet recording head 19 can be configured to discharge single color ink or five or more color inks. The inkjet recording head 19 includes a plurality of ink discharge nozzles arranged in one array or a plurality of arrays for each color. The ink discharge method can be, for example, a piezo method or a thermal method but not limited thereto.

The gyro sensor 20 is a sensor to detect the angular velocity of the handheld printer 10 when the handheld printer 10 rotates around an axis perpendicular to the recording medium. Details of the gyro sensor 20 will be described later.

The navigation sensor 30 is a sensor to detect the amount of movement of the handheld printer 10 in each predetermined cycle time, which is, for example, determined by a manufacturer of the handheld printer 10 and stored in a memory. The navigation sensor 30 includes, for example, a light source 38 (illustrated in FIG. 4), such as a light emitting diode (LED) or a semiconductor laser, and an image sensor to capture an image of the recording medium. As the user moves the handheld printer 10 to scan the recording medium, the navigation sensor 30 sequentially captures or detects minute edges of the recording medium. The handheld printer 10 analyzes the distance between the edges to obtain the travel distance of the handheld printer 10. Details of the navigation sensor 30 will be described later. Yet alternatively, the handheld printer 10 can include a multi-axis accelerometer as the navigation sensor 30 to detect the movement amount based on the detection by the multi-axis accelerometer.

Figure 3:
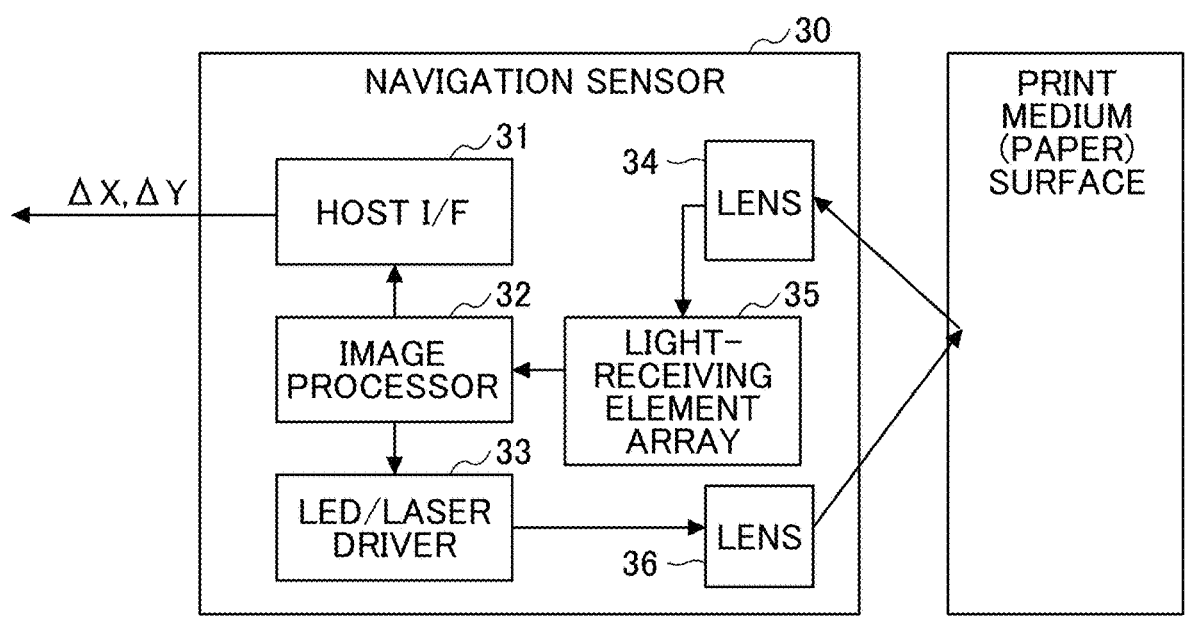
FIG. 3 is a block diagram of a hardware configuration of a navigation sensor of the handheld printer illustrated in FIG. 1.

FIG. 3 is a block diagram of a hardware configuration of the navigation sensor 30. The navigation sensor 30 includes a host I/F 31, an image processor 32, an LED and laser driver (LED/laser driver) 33, a lens 34, a light-receiving element array 35, and a lens 36. The LED/laser driver 33 includes the light source 38 (illustrated in FIG. 4) such as an LED or a semiconductor laser and a control circuit integrated with each other and irradiates the recording medium via a lens 36 with light according to a command from the image processor 32. The light-receiving element array 35 receives light reflected from the recording medium through the lens 34. The two lenses (the lenses 34 and 36) are used to adjust an optical focus on the surface of the recording medium.

Figure 4:
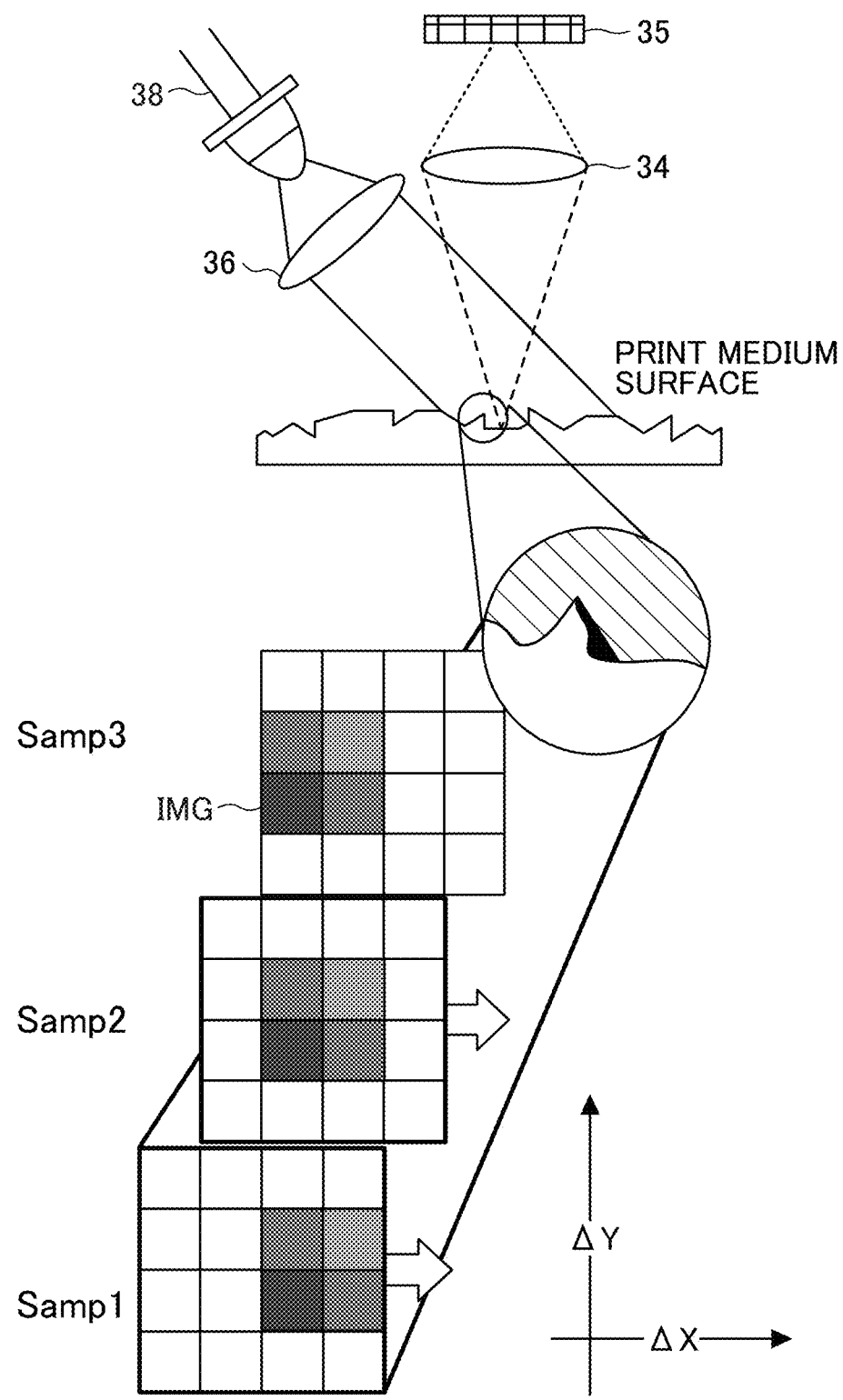
FIG. 4 is a diagram for explaining a function of the navigation sensor illustrated in
FIG. 3.

The light-receiving element array 35 (a light-receiving sensor) includes a light-receiving element such as a photodiode sensitive to a wavelength of light and generates image data from the received light. The image processor 32 acquires the image data from the light-receiving element array 35 and calculates the distance (movement amount) by which the navigation sensor 30 has moved, based on the image data. In FIG. 4, a movement amount $\Delta X$ represents the amount of movement in the X-axis direction, and a movement amount $\Delta Y$ represents the amount of movement in the Y-axis direction. The image processor 32 outputs the calculated movement amounts to the controller 14 via the host I/F 31.

As the light source 38, LEDs are useful to irradiate a recording medium having a rough surface, such as paper. When irradiated, the rough surface creates shades to be used as characterizing portions. With the characterizing portions, the amount of movements in the X-axis direction and the Y-axis direction can be calculated accurately. On the other hand, to irradiate a recording medium having a smooth surface or is transparent recording medium, a laser diode (LD) that emits laser light can be used as the light source. The semiconductor laser can create, for example, a striped pattern or the like as a characterizing portion on the recording medium. With the characterizing portion, the amount of movement can be calculated accurately.

FIG. 4 is a diagram for explaining a function of the navigation sensor 30. Referring to FIGS. 3 and 4, the image processor 32 acquires, at each predetermined sampling timing (i.e., in each predetermined period), the data from the light-receiving element array 35 that has received the reflected light from the recording medium. The image processor 32 then matrixes the acquired data in predetermined resolution units. The image processor 32 then detects a difference between the data acquired at an immediately preceding sampling timing and the data acquired at the current sampling timing and calculates the movement amount.

For example, in the example illustrated in FIG. 4, an image IMG represented by black or gray patches moves as time elapses from a sampling timing Samp1 to a subsequent sampling timing Samp2 and to a subsequent sampling timing Samp3.

Assuming that the sampling timing Samp1 is a reference, output values, that is, movement amounts $(\Delta X, \Delta Y)$ at the sampling timing Samp2 are expressed as (1,0). The movement amounts $\Delta X$ and $\Delta Y$ indicate amounts of movement in the horizontal direction and the vertical direction, respectively, with reference to the orientation of the navigation sensor 30. In a configuration where one navigation sensor 30 is used, even if the navigation sensor 30 rotates on the recording medium, the rotational component is not detected. The resolution of amount of movement depends on a requirement of the device on which the navigation sensor 30 is mounted. Assuming that the navigation sensor 30 is mounted on a printer, for example, a resolution of about 1200 dpi is required.

Figure 5:
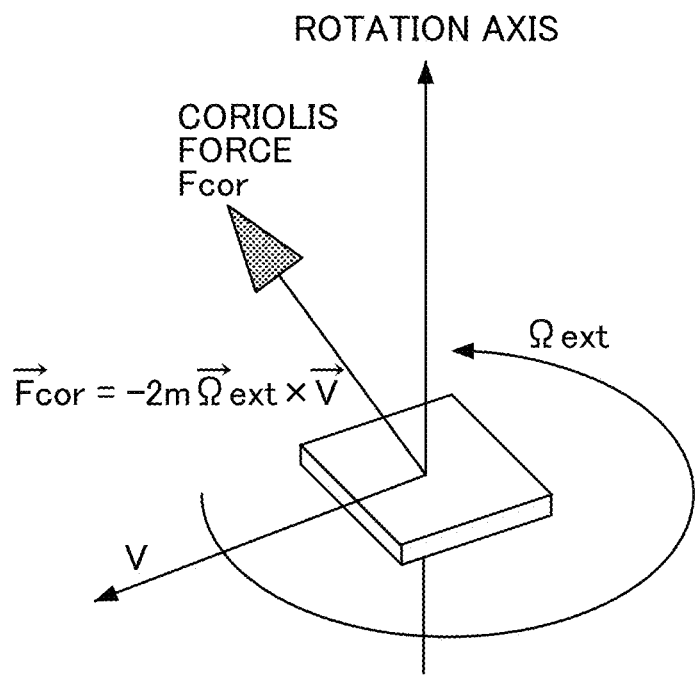
FIG. 5 is a diagram illustrating a function of a gyro sensor illustrated in FIG. 2.

FIG. 5 is a diagram illustrating a function of the gyro sensor 20. A general vibration-type gyro sensor will be described below. As illustrated in FIG. 5, Coriolis force Fcor is the force generated in a direction orthogonal to both of a movement direction of mass and a rotation axis at the time when rotation is given to the mass m currently moving.

In the gyro sensor 20, an internal micro electro mechanical systems (MEMS) element is vibrated to generate a velocity v illustrated in FIG. 5. An angular velocity is obtained utilizing a fact that the Coriolis force is applied to the MEMS element when external rotation Ωext is applied to the MEMS element. The Coriolis force is detected to calculate the angular velocity applied to an object. With a signal processing inside the gyro sensor 20, the gyro sensor 20 amplifies, filters, and synchronizes the detected Coriolis force to compute an angular velocity and outputs the angular velocity to an external component.

Figure 6:
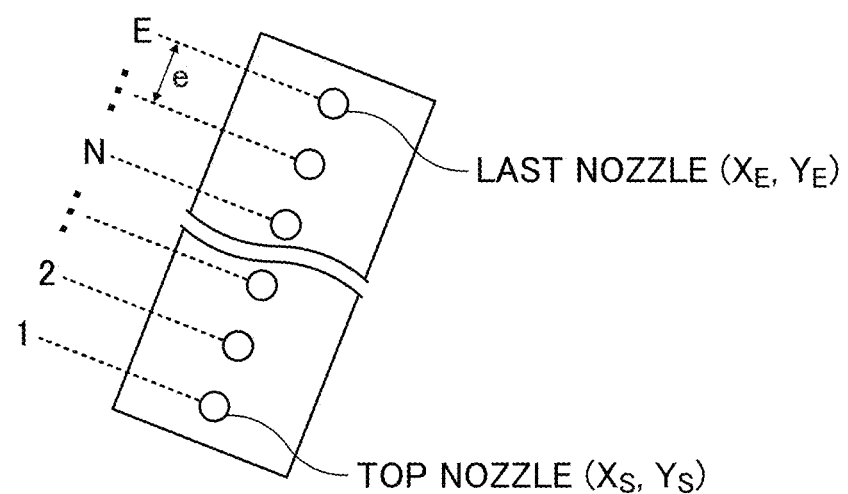
FIG. 6 is a diagram for explaining calculation of an inkjet nozzle position, according to one embodiment.

FIG. 6 is a diagram for explaining the calculation of the inkjet nozzle position. A description is given below of a method for calculating the coordinates of each nozzle with a simple proportional calculation. Since a position of the navigation sensor 30 and the position thereof relative to each nozzle are already known, the position of each nozzle can be obtained by using a method of acquiring the position of the navigation sensor 30 and obtaining the coordinates of each nozzle.

In the nozzle array illustrated in FIG. 6, nozzles are arranged at regular intervals e. Accordingly, the coordinates (NZL$_{NX}$, NZL$_{NY}$) of a nozzle N can be calculated from the coordinates (X$_S$,Y$_S$) of a top nozzle and coordinates (X$_E$,Y$_E$) of a last nozzle, according to the following equation.

where E is a total number of nozzles, and N represents an ordinal number of the nozzle counted from the top nozzle (1) to the last nozzle (E).

$$NZL_{Nx}=X_S+(X_E-X_S)/(E-1)\times N$$

$$NZL_{Ny}=Y_S+(Y_E-Y_S)/(E-1)\times N$$

Figure 7:
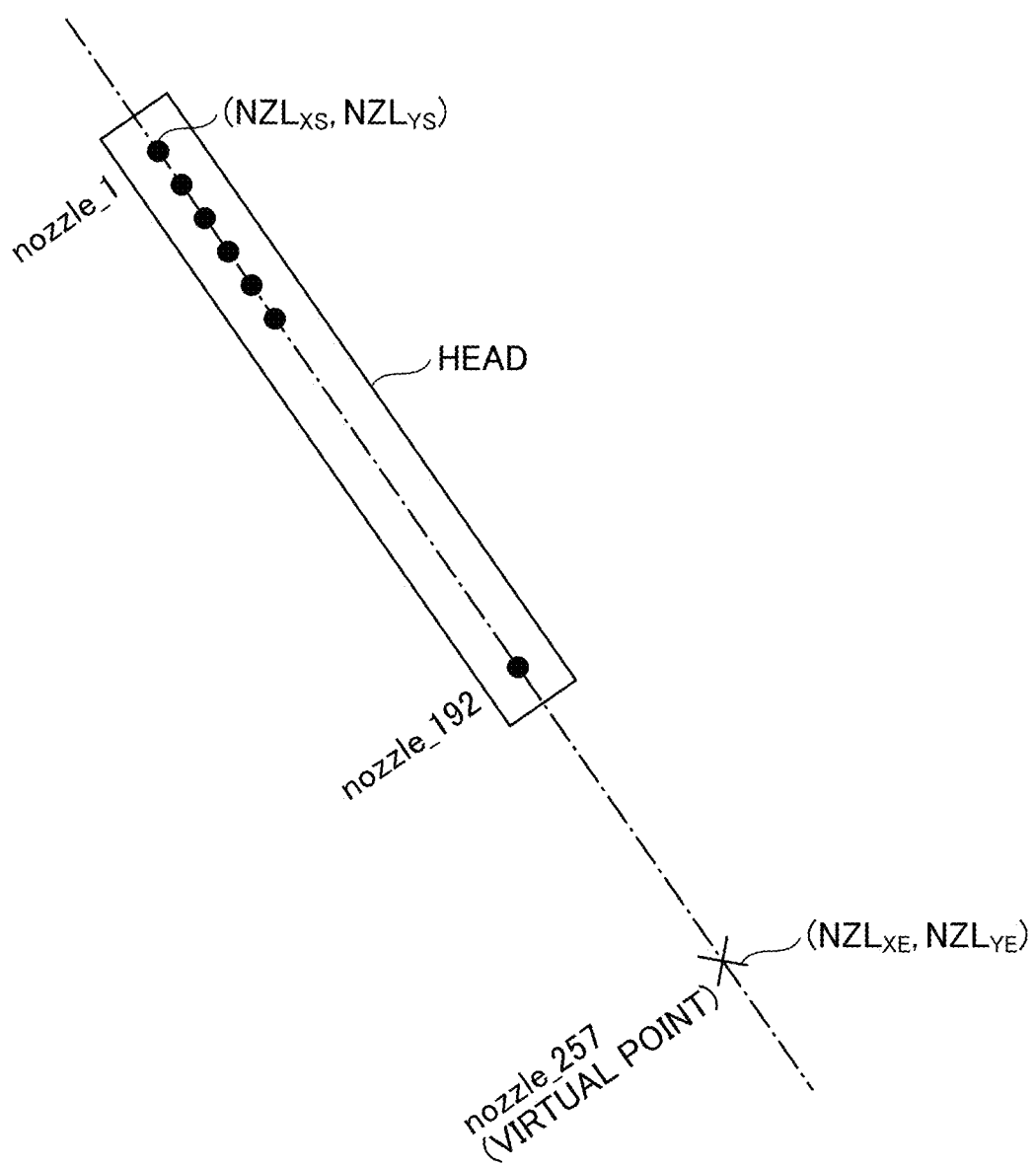
FIG. 7 is another diagram for explaining the calculation of the inkjet nozzle position, according to one embodiment.

FIG. 7 is a diagram for explaining the calculation of the inkjet nozzle position. The calculation of nozzle coordinates is made simple as follows. To divide an entire nozzle array by a power of 2, a virtual point nozzle_257 is provided as illustrated in FIG. 7, and the coordinates of a point nozzle_1 to a point nozzle_192 where nozzles are actually arranged are calculated. The coordinates at the point nozzle_1 are (NZL$_{XS}$,NZL$_{YS}$) and the coordinates of the virtual point nozzle_257 are (NZL$_{XE}$,NZL$_{YE}$). According to the following equation, the coordinates (NZL$_{NX}$,NZL$_{NY}$) of a Nth point nozzle_N in the counting from the point nozzle_1 toward the point nozzle_192 can be obtained.

$$NZL_{NX}=\{NZL_{XS}\times(257-N)+NZL_{XE}\times(N-1)\}\div 256$$

$$NZL_{NY}=\{NZL_{YS}\times(257-N)+NZL_{YE}\times(N-1)\}\div 256$$

Figure 8:
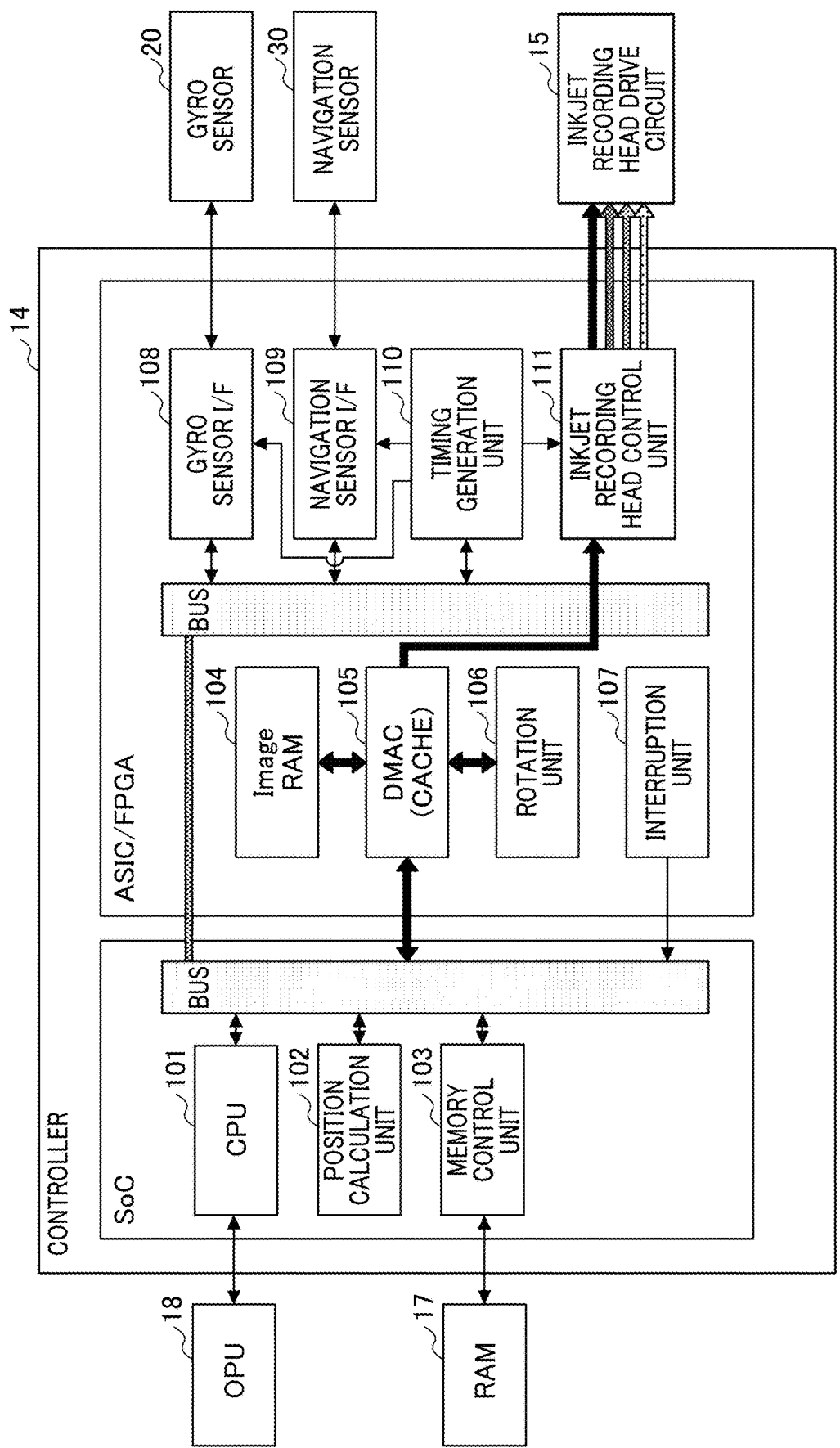
FIG. 8 is a block diagram illustrating a configuration of a controller according to one embodiment.

FIG. 8 is a block diagram of the controller 14 according to the present embodiment.

As illustrated in FIG. 8, the controller 14 includes the CPU 101, a position calculation unit 102, a memory control unit 103, an image RAM 104, a direct memory access controller (DMAC) 105 (a cache memory), a rotation unit 106, an interruption unit 107, a gyro sensor I/F 108, a navigation sensor I/F 109, a timing generation unit 110, and an inkjet recording head control unit 111. For example, as illustrated in FIG. 8, the hardware of the controller 14 (a processor) can be implemented by a system on chip (SoC) and an/FPGA that communicate with each other via a bus. The/FPGA means that the hardware can be designed to be implemented by either of and FPGA, and the hardware can be implemented by other technology than/FPGA. Further, the controller 14 can be implemented by one chip or board without using separate chips (or separate boards) respectively mounting the SoC and the/FPGA. Alternatively, the controller 14 can be implemented by three or more chips or boards. Further, each functional unit of the controller 14 can be implemented by the firmware executed by the CPU 101 or a wired logic circuit included in the SoC or the/FPGA.

The CPU 101 reads and executes the firmware loaded in the RAM 17 via the memory control unit 103, to implement each functional unit of the controller 14.

The position calculation unit 102 calculates the position of the handheld printer 10, based on the movement amount (movement information) detected for each sampling cycle and output from the navigation sensor 30 and the angular velocity (movement information) detected for each sampling cycle and output from the gyro sensor 20. The position of the handheld printer 10 necessary for accurate printing is, strictly speaking, the position of the nozzle. The position of the nozzle can be calculated when the position of the navigation sensor 30 is known, as described above with reference to FIGS. 6 and 7. The position calculation unit 102 calculates the target discharge position of ink. The position calculation unit 102 can be implemented by the CPU 101 executing the firmware or a wired logic circuit.

The memory control unit 103 controls reading from or writing to the RAM 17 from each functional unit.

The image RAM 104 is used to store information to be read and written at high speed. For example, the position information of the navigation sensor 30, the image data read from the RAM 17, and the like are stored in the image RAM 104. The hardware of the image RAM 104 can be constructed with an SRAM, for example.

The DMAC 105 (cache) 105 and the rotation unit 106 calculate the position of each nozzle of the inkjet recording head 19, from the position information of the navigation sensor 30 calculated by the position calculation unit 102. Then, the DMAC 105 (cache) 105 and the rotation unit 106 retrieve, from the RAM 17, image data corresponding to the nozzle position, rotate the image data according to the designated position and inclination of the head, and output the image data to the inkjet recording head control unit 111.

The interruption unit 107 detects completion of communication of the navigation sensor I/F 109 with the navigation sensor 30 and outputs an interrupt signal for reporting the completion to the CPU 101. With the interruption, the CPU 101 acquires the movement amounts ΔX and ΔY stored in an internal register by the navigation sensor I/F 109. The interruption unit 107 further has a function to report a status such as an error. Similarly, regarding the gyro sensor I/F 108, the interruption unit 107 outputs an interrupt signal for notifying the CPU 101 of completion of communication of the gyro sensor I/F 108 with the gyro sensor 20.

The gyro sensor I/F 108 acquires the angular velocity detected by the gyro sensor 20 at the timing generated by the timing generation unit 110 and stores the angular velocity in the RAM 17 or a register inside the controller 14.

The navigation sensor I/F 109 communicates with the navigation sensor 30, receives the movement amounts ΔX and ΔY as the movement information output from the navigation sensor 30, and stores the movement amounts ΔX and ΔY in the RAM 17 or the register inside the controller 14.

The timing generation unit 110 notifies the navigation sensor I/F 109 and the gyro sensor I/F 108 of the timings to read information from the gyro sensor 20 and the navigation sensor 30, respectively, and notifies the inkjet recording head control unit 111 of the drive timing.

The inkjet recording head control unit 111 performs dithering or the like of the image data to convert the image data into a set of points representing the image with point size and density. Through such conversion, the image data becomes data of discharge positions and point sizes. The inkjet recording head control unit 111 outputs a control signal corresponding to the point size to the inkjet recording head drive circuit 15. The inkjet recording head drive circuit 15 generates a drive waveform using the drive waveform data corresponding to the control signal. In addition, the inkjet recording head control unit 111 determines whether to discharge ink in accordance with the position of the nozzle. The inkjet recording head control unit 111 determines to discharge ink when there is a target discharge position or determines not to discharge ink when there is no target discharge position.

Figure 9:
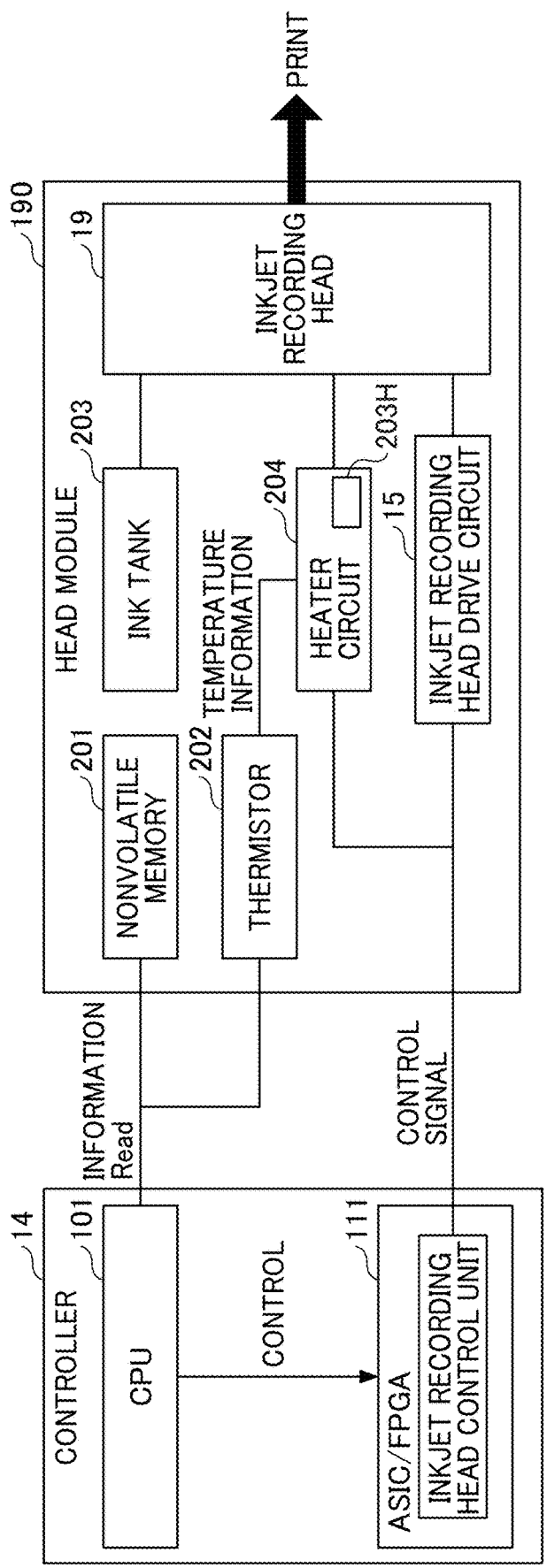
FIG. 9 is a block diagram illustrating a configuration a head module according to one embodiment.

FIG. 9 is a block diagram of the head module 190 in the present embodiment. As illustrated in FIG. 9, the head module 190 includes the inkjet recording head drive circuit 15, the inkjet recording head 19, a nonvolatile memory 201, a thermistor 202 (a temperature sensor), and an ink tank 203.

The nonvolatile memory 201 stores information such as an ink cartridge identification (ID) and a residual ink amount. Since the nonvolatile memory is nonvolatile, the information is held even when power supply is cut off. The thermistor 202 detects a temperature of the inkjet recording head 19. The ink tank 203 stores ink to be discharged and supplies the ink to the inkjet recording head 19 at the time of discharge. The heater circuit 204 performs heater control in order to heat the inkjet recording head 19 based on temperature information from the thermistor 202.

In order to prevent print defect due to characteristics of ink, such as, thinned printing, it is desirable to heat the head to an appropriate temperature range of, for example, 40 to 60 degrees centigrade, in order to ensure print quality. In a structure like a handheld printer in which the head is exposed during printing, desirably the temperature of the head is kept in a range not to harm the user even if the user accidentally touches, with the hand, the head immediately before printing.

The head module 190 is connected to the controller 14 via a serial I/F or the like and exchanges information and control signals with the controller 14. In response to a control request received from the CPU 101, the inkjet recording head control unit 111 performs control for the inkjet recording head drive circuit 15, such as setting for a drive waveform and on/off of heater control.

Figure 10B:
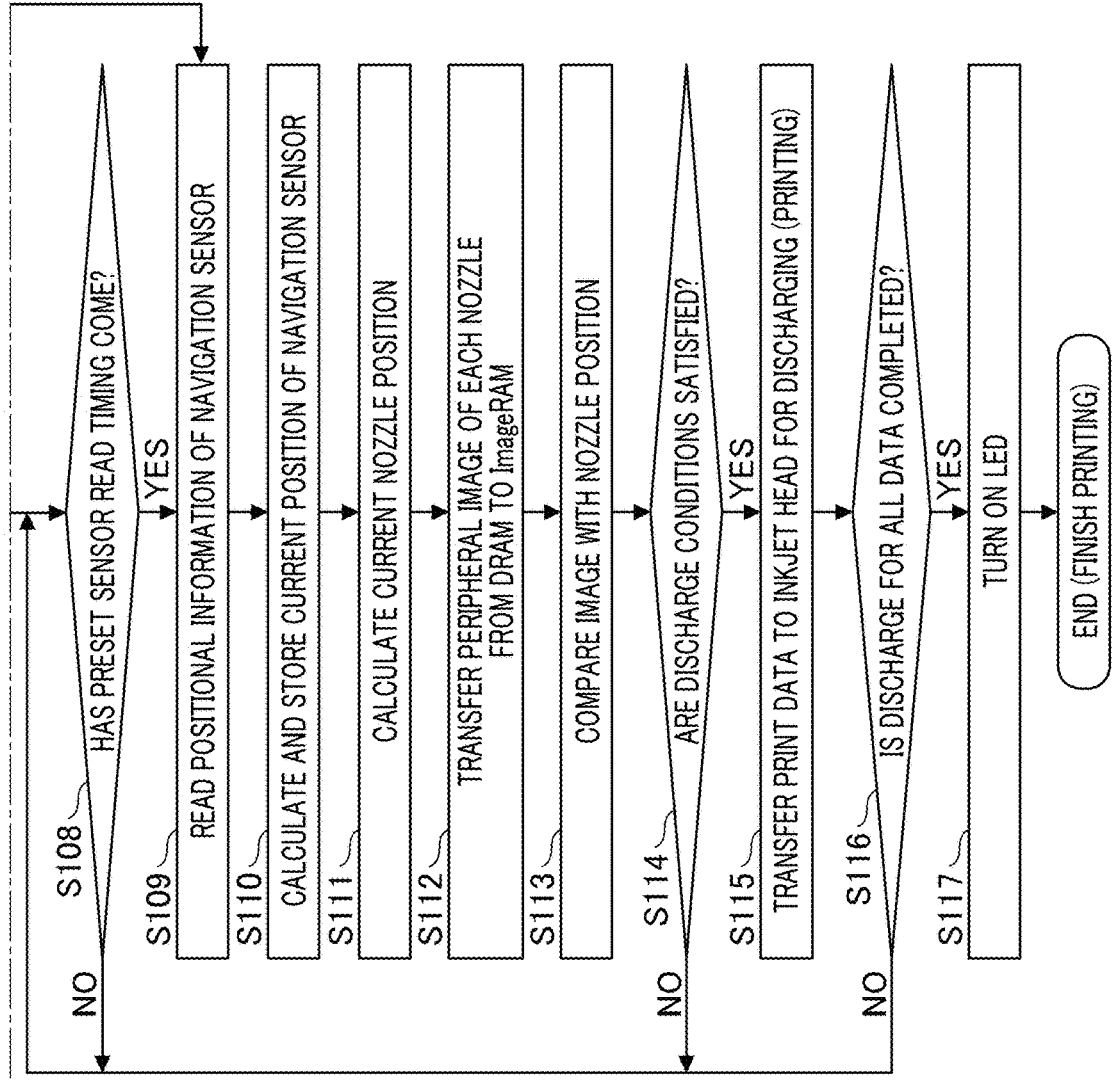

FIG. 10 is a flowchart illustrating exemplary print processing by the handheld printer 10 according to one embodiment.

At S201, according to an operation made by a user, the image input device 100 turns on the handheld printer 10, and the handheld printer 10 starts operation. Subsequently, the handheld printer 10 is supplied with power from a power source, and the controller 14 performs initialization of the devices such as a position sensor and launches the devices (S101). At S102, the handheld printer 10 determines whether the initialization has completed. In response to completion of the initialization (Yes at S102), for example, the handheld printer 10 turns on the LED of the OPU 18 as a notification for the user of a printable state (S103). The user confirms the notification and selects an image to be printed by the image input device 100, such as a smart device or a personal computer (PC), (S202). Subsequently, the user instructs execution of a print job, such as wireless output of data in the format of TIFF (Tagged Image File Format), JPEG (Joint Photographic Experts Group) format, or the like, from an application or a printer driver installed in the image input device 100 (S203). In response to input of the image data, the handheld printer 10 notifies the user of the acceptance with, for example, blinking of an LED or the like (S104).

At S204, the user determines the initial position of the handheld printer 10 on a recording medium, such as a notebook, and presses a print start button of the handheld printer 10 at S205. At S206, the user freely moves the handheld printer 10 (freehand scanning) on the plane on the recording medium to form an image (S206).

While the user performs operations at S205 and S206, the handheld printer 10 receives pressing of the print start button and instructs the navigation sensor I/F 109 to read the position information of the navigation sensor 30. Subsequently, the navigation sensor 30 starts detecting the movement amount and stores the position information in the internal memory (e.g., the image RAM) of the controller 14 (S301). The navigation sensor I/F 109 communicates with the navigation sensor 30 and reads the position information (S105). Subsequently, the handheld printer 10 sets the position defined by the position information as an initial position and sets the coordinates, for example, to coordinate (0, 0) at S106.

At S107, the timing generation unit 10 in the controller 14 measures time, for example, with a counter. At S108, the controller 14 determines whether the time matches a predetermined timing for reading the position information generated by the navigation sensor 30, which is equivalent to each drive period of the inkjet recording head control unit 111. Each time the reading timing arrives (Yes at S108), at S109, the controller 14 repeats acquisition of the position information. At S110, based on the previously calculated coordinates (X,Y) of the navigation sensor 30 and the movement amount ($\Delta X, \Delta Y$) based on the currently acquired position information, the controller 14 calculates the current coordinates of the navigation sensor 30 using the method described with reference to FIGS. 6 and 7 and stores the current coordinates in the internal memory of the controller 14. In S111, based on the calculated current position information of each navigation sensor 30 and predetermined assembling position information of the navigation sensor 30 and the inkjet recording head 19, the controller 14 calculates coordinates of the position of each nozzle on the inkjet recording head 19.

At S112, based on the position information of each nozzle calculated in S111, the DMAC 105 (cache) and the rotation unit 106 retrieves, from the RAM 17, the image data of the inkjet recording head 19 or image data around each nozzle, rotate the image according to the position and inclination of the inkjet recording head 19, specified by the position information, and stores the rotated image in the image RAM 104. At S113, the DMAC 105 (cache) performs coordinate comparison between the image data stored in the internal memory and each nozzle position and determines whether a predetermined discharge condition is satisfied at S114. In response to a determination that the predetermined discharge condition is satisfied (Yes in S114), the DMAC 105 (cache) outputs the image data to the inkjet recording head control unit 111 (S115). Then, the inkjet recording head 19 discharges liquid according to the image data.

By contrast, in response to a determination that the predetermined discharge condition is not satisfied (No in S114), the process returns to S108.

The handheld printer 10 repeats the operation from S108 to S115 to form an image on the recording medium. At S116, the handheld printer 10 determines whether ink discharge according to entire image data has completed. When ink discharge according to entire image data has completed (Yes in S116), the handheld printer 10 notifies the user of completion of printing with, for example, LED lighting at S117. By contrast, in response to a determination that there remains data according to which ink discharge is not yet performed, (No in S116), the process returns to S108.

When the user determines that sufficient ink discharge has been performed, the user can press a print completion button to complete the printing, even when ink discharge has not yet completed for the entire data.

Figure 11:
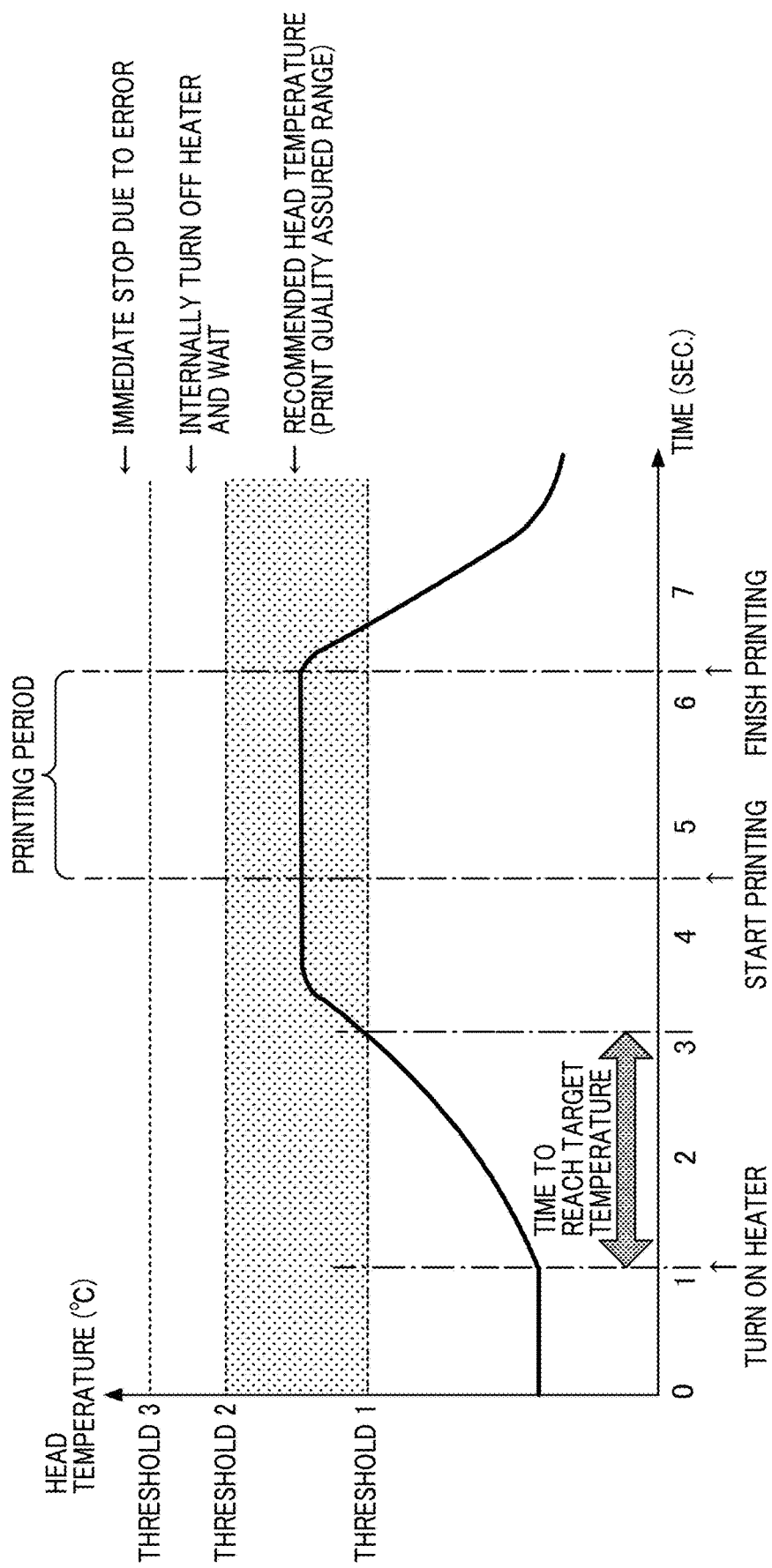
FIG. 11 is a graph illustrating exemplary head temperature transition by heater control according to one embodiment.

FIG. 11 is a graph illustrating exemplary head temperature transition by heater control in the embodiment of the present disclosure. In FIG. 11, a horizontal axis represents a time sequence starting from when the handheld printer 10 turns on a heater to start printing until when printing is finished, and a vertical axis represents a head temperature to be controlled.

The thresholds in the graph of FIG. 11 define the head temperature ranges according to the heater control performed by the heater circuit 204 illustrated in FIG. 9. In a case where the temperature is lower than a threshold 1, the heater circuit 204 performs heating by the heater. In a case where the temperature is in a range from the threshold 1 to a threshold 2, the head temperature is within a recommended temperature range, that is, a print quality assured range, and printing can be performed. In a case where the temperature is equal to or higher than the threshold 2, the heater circuit 204 turns off the heater 203H and waits until the temperature drops. In a case where the temperature is equal to or higher than a threshold 3, the heater circuit 204 determines the state as abnormal, and the handheld printer 10 is immediately stopped due to an error.

More specifically, when a print job is received in a standard temperature state, the controller 14 causes the heater circuit 204 to turn the heater on. With this control, the heater starts heating the inkjet recording head 19, and the temperature reaches a target temperature range in about 2 seconds. With a print start trigger, the handheld printer 10 starts print operation. Since printing is performed after the inkjet recording head 19 is heated to the recommended temperature by the heater control, print quality can be better improves compared with a case of not performing the heater control. During the heater control, the controller 14 causes the heater circuit 204 to turn on or off the heater in each print cycle to keep the temperature in the temperature range from the threshold 1 to the threshold 2 illustrated in FIG. 11. Then, the handheld printer 10 finishes the print processing with a print finish trigger.

Figure 12:
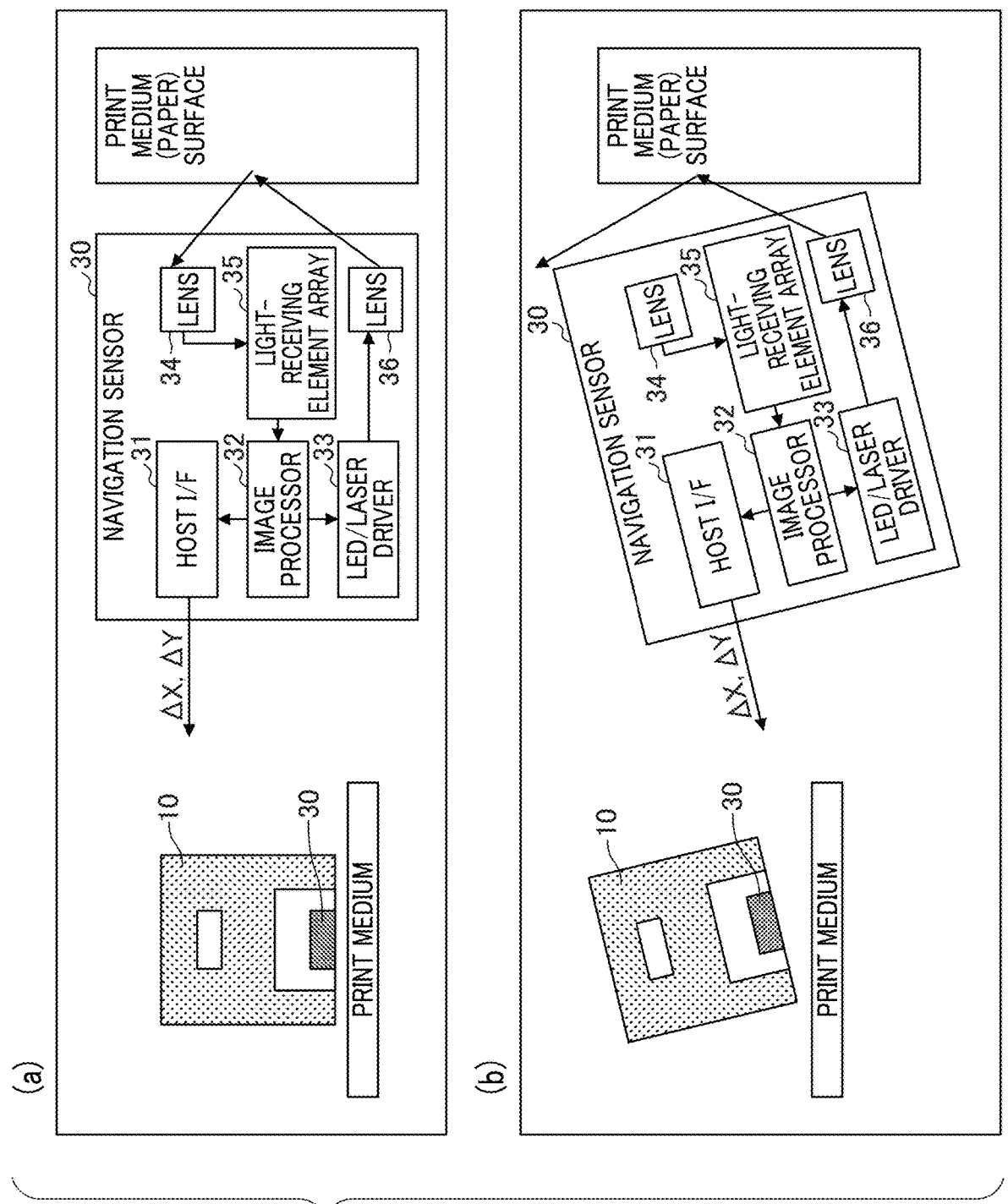
FIG. 12 is a diagram for explaining a method for determining floating of the handheld printer by the navigation sensor, according to one embodiment.

FIG. 12 is a diagram for explaining a method for determining floating of the handheld printer 10 by the navigation sensor 30.

In a state (a) illustrated in FIG. 12 where the handheld printer 10 is not floating, the navigation sensor 30 irradiates the recording medium with light from the LED and calculates the movement amount with the amount of received light reflected from the recording medium. The handheld printer 10 and the recording medium are in substantially parallel contact.

In a state (b) in FIG. 12, the handheld printer 10 is floating. If the handheld printer 10 floats from the recording medium, even if the navigation sensor 30 irradiates the recording medium with light from the LED, the navigation sensor 30 does not receive the light reflected from the recording medium. The handheld printer 10 acquires, from the navigation sensor 30, information indicating that the navigation sensor 30 does not receive the light, thereby detecting the floating. While the handheld printer 10 floats from the recording medium, the handheld printer 10 is not in close contact with the recording medium. For example, the handheld printer 10 tilts in either direction, and a clearance is present between the handheld printer 10 and the recording medium.

The above-described float detection is executed by the controller 14 based on information from the navigation sensor 30.

FIGS. 13A to 13B are diagrams illustrating state transition relating to the heater control from before reception of a print job according to the present embodiment. "HEAT" in FIGS. 13A to 13B corresponds to turning on the heater by the heater circuit 204. FIG. 13A illustrates state transition from a state before reception of a print job, in which the handheld printer 10 is "floating" as in the state (b) illustrated in FIG. 12.

In a state S13a-1 (no data) before the handheld printer 10 receives a print job, even though the handheld printer 10 performs no operation for a certain period or a print start trigger occurs, the controller 14 does not execute any processing and the state does not change. To determine the occurrence of "no operation for a certain period", the controller 14 determines presence or absence of user operation based on output of the gyro sensor 20 or the navigation sensor 30. Such a period of "no operation for a certain period" is also referred to as "standby time". In other words, the controller 14 serves as a standby time detecting unit to detect an occurrence of standby time in which no user operation is detected for a predetermined period, which is, for example, empirically determined by a manufacturer of the handheld printer 10 and stored in a memory. When the handheld printer 10 receives a print job in the state S13a-1 (no data), the state transitions to a state S13a-2 (data present). However, the floating is detected. Accordingly, even though the handheld printer 10 performs no operation for a certain period or the print start trigger occurs, the controller 14 does not execute any processing and the state does not change similar to the state before reception of a print job. When the floating is resolved and the sheet is detected in the state S13a-2 (data present), the state transitions to a state S13a-3 (data present). Then, the heater circuit 204 turns on the heater 203H. When the floating is detected in the state S13a-3 (data present), the state transitions to the state S13a-2 (data present), and the heater circuit 204 turns off the heater 203H.

FIG. 13B illustrates the state transition from a state without the "floating" illustrated in FIG. 12 before reception of a print job. In a state S13b-1 (no data) before the handheld printer 10 receives a print job, the controller 14 does not execute processing and the state does not change even though the handheld printer 10 performs no operation for a certain period or the print start trigger occurs. When the handheld printer 10 receives a print job in the state S13b-1 (no data), the state transitions to a state S13b-2 (data present), and the heater circuit 204 turns on the heater 203H. When the handheld printer 10 detects an occurrence of "no operation for a certain period (standby time)" in the state S13b-2 (data present), the state transitions to a state S13b-3 (data present). Then, the heater circuit 204 turns off the heater 203H. When the print start trigger occurs in the state S13b-3 (data present), the state transitions to the state S13b-2 (data present). The heater circuit 204 turns on the heater 203H again.

FIG. 14 is a diagram illustrating state transition relating to the heater control from a state in which a print job is received. "HEAT" in FIG. 14 corresponds to turning on the heater by the heater circuit 204. FIG. 14 illustrates the state transition from the state in which the print job is already received and the "floating" illustrated in (b) in FIG. 12 is not detected.

In a state S14-1 (data present) after the handheld printer 10 has received the print job, the heater 203H has been on as illustrated in FIG. 13B. When a print start trigger occurs, the state transitions to a state S14-2 (printing). In the state S14-2 (printing), even though the print start trigger occurs, the state is unchanged, and printing is continued. Additionally, in a case where floating is detected in the state S14-2 (printing), the state transitions to a state S14-3 (no data) to finish the printing, and the heater circuit 204 turns off the heater 203H. The state S14-3 is the same as the state S13a-1 (no data) with the floating illustrated in FIG. 13A. Additionally, in a case where the print finish trigger occurs or no operation is performed for the certain period in the state S14-2 (printing), the state transitions to a state of "no data" S14-4 to finish the printing. Then, the heater circuit 204 turns off the heater 203H. The state S14-4 is the same as the state S13b-1 (no data) without the floating illustrated in FIG. 13B.

Figure 15B:
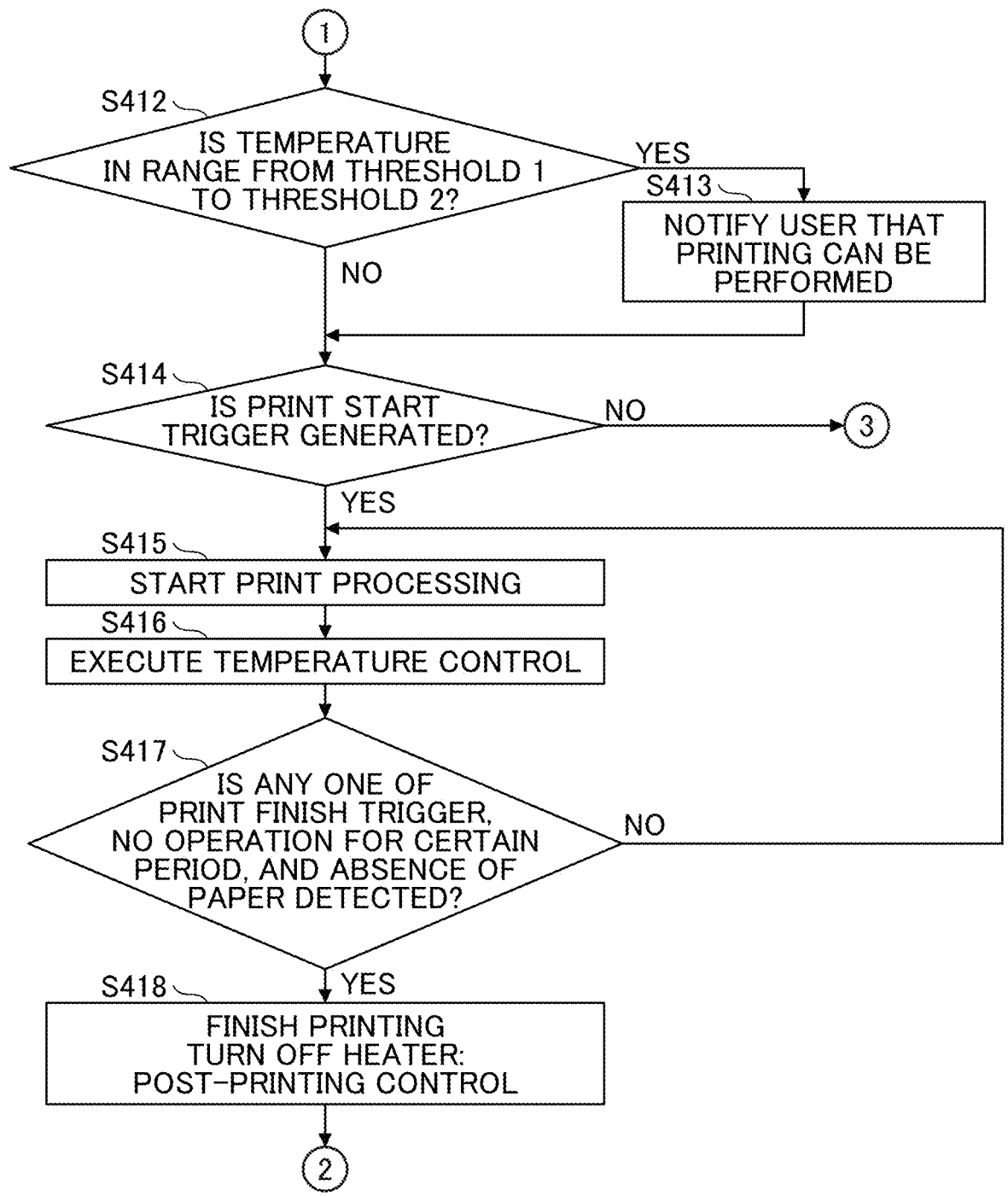

FIG. 15 is a flowchart illustrating exemplary heater control in the present embodiment. The threshold 1, the threshold 2 and the threshold 3 illustrated in FIG. 11 are used for description.

After the power source of the handheld printer 10 is turned on, in S401, the controller 14 acquires an absolute temperature from the thermistor 202. At S402, the controller 14 determines whether or not a print job is received. When a print job is received, processing proceeds to S403 (YES in S402). The handheld printer 10 is in a standby state until a print job is received (NO in S402). In S403, the controller 14 determines whether absence of the sheet (e.g., paper) is detected or no operation for the certain period is detected. In a case where the determination is YES, the processing proceeds to S404. In a case of NO, the processing proceeds to S405. In S404, the heater circuit 204 turns off the heater 203H, and the processing returns to S403. In S405, the controller 14 acquires temperature information from the thermistor 202 and uses the temperature information to determine the head temperature. The temperature information can be information indicating a temperature difference.

Subsequently, in a case where the acquired temperature is the threshold 1 or lower (YES in S406), the heater 203H is turned on (S407), and the processing proceeds to S408. When the acquired temperature is higher than the threshold 1 (NO in S406), the processing proceeds to S408.

In S408, in a case where the acquired temperature is in a range from the threshold 2 to the threshold 3 (YES in S408), the head is deemed to be in a high temperature state, the heater 203H is turned off (S409). The processing returns to S403. When the acquired temperature is not in the range from the threshold 2 to the threshold 3 (NO in S408), the processing proceeds to S410.

In S410, in a case where the acquired temperature is the threshold 3 or higher (YES in S410), the processing proceeds to S411. The head is deemed to be in an abnormal state, and the heater 203H is turned off. Additionally, the controller 14 reports an error to the user with an indicator such as an LED, stops printing as termination due to abnormality. When the acquired temperature is lower than the threshold 3, the processing proceeds to S412.

In S412, in a case where the acquired temperature is in the range of from the threshold 1 to the threshold 2 (YES in S412), the controller 14 determines that the head temperature is within the print quality assured range. The controller 14 notifies the user of a printable state with the indicator such as an LED (S413), and the processing proceeds to S414. When the acquired temperature is in the range from the threshold 1 to the threshold 2 (NO in S412), the processing proceeds to S414.

In S414, when a print start trigger is not generated (NO in S414), the processing returns to S403. When the print start trigger occurs (YES in S414), the processing proceeds to S415. Subsequently, the print processing is started (S415). During the print processing, temperature control is executed in order to keep the temperature within the print quality assured range (range from the threshold 1 to the threshold 2). Specifically, the heater circuit 204 turns the heater 203H on or off based on the temperature information from the thermistor 202 (S416).

In S417, in a case where none of a print finish trigger, no operation for a certain period, and absence of the sheet (NO in S417) is detected, the print processing is continued. In a case where any one of no operation for the certain period and absence of the sheet (YES in S417) is detected, the processing proceeds to S418, and the handheld printer 10 finishes printing. Then, the heater circuit 204 turns off the heater 203H. Subsequently, the processing returns to S402 to wait for a print job.

Note that, when a print job is received in S402, the heater circuit 204 can turn on the heater immediately.

Figure 16:
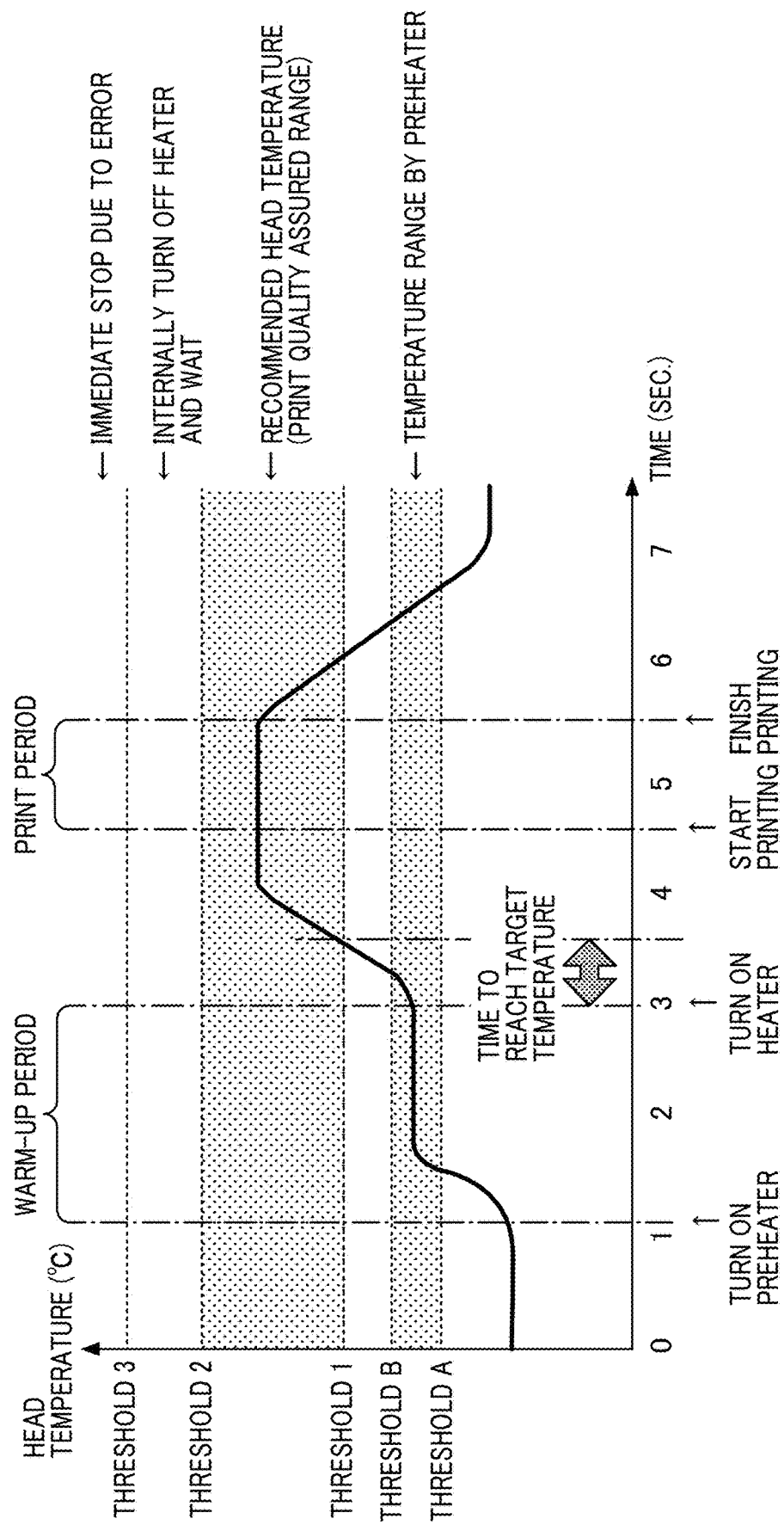
FIG. 16 is a graph illustrating exemplary head temperature transition by heater and preheater control according to one embodiment.

FIG. 16 is a graph illustrating exemplary head temperature transition by heater and preheater control according to the present embodiment. In FIG. 16, the horizontal axis represents a time sequence of operation of the handheld printer 10 including preheater control, and the vertical axis represents the head temperature to be controlled. FIG. 16 illustrates the time sequence from turning a preheater on by the preheater control, turning the heater on by the heater control, starting printing, until completion of printing.

The thresholds in the graph of FIG. 16 define the head temperature ranges according to the heater control and the preheater control performed by the heater circuit 204 illustrated in FIG. 9.

When a print job is received in the standard temperature state, the heater circuit 204 turns on the preheater, controlled by the controller 14. The head is heated to a temperature range lower than the print quality assured range. As illustrated in FIG. 16, a period during which the preheater is turned on is defined as a warm-up period. The temperature of the inkjet recording head 19 is kept at such a temperature that a user is not get burnt even though the user touches the exposed head. Accordingly, safety can be secured even when the user erroneously touches the head.

Next, the controller 14 determines whether the user has moved the handheld printer, that is, whether operation to actually perform printing is made based on, for example, whether a state in which a detected angular velocity or a detected movement amount exceeds a predetermined threshold is continued based on angular velocity information of the gyro sensor 20 or movement amount information of the navigation sensor 30. In a case where the controller 14 determines that the user has performed operation to start printing (hereinafter referred to as "user operation"), the controller 14 starts the preheater control or the heater control. For example, in the case where the handheld printer 10 is moved in the air, the preheater control or the heater control is not started from detection of the floating by the navigation sensor 30.

Since, due to the preheater control, the preheater is turned on during the warm-up period and the head temperature is raised to a range of from a threshold A to a threshold B illustrated in FIG. 16, a time to reach a target temperature can be shortened compared with the case where only the heater control is performed. For example, 2 seconds are required to reach the target temperature in the case of FIG. 11 in which only the heater control is performed, but the time to reach the target temperature is shortened to less than 1 second in the case of FIG. 16 in which the preheater control is performed. Therefore, a time from when operation is started by a user until when printing is started can be shortened. The heater control after start of printing is similar to the heater control in FIG. 11.

While the preheater is on, when the temperature reaches a reload notification temperature being the threshold C illustrated in FIG. 16, the controller 14 issues a notification to notify the user that the handheld printer is capable of being operated. Such a notification can reduce the total operation time by the user and save power owing to the reduction of operation time.

FIGS. 17A and 17B are diagrams illustrating state transition relating to the heater and preheater control from before reception of a print job in the present embodiment. "PREHEAT" or "HEAT" in FIGS. 17A and 17B correspond to turning on the preheater or turning on the heater by the heater circuit 204 respectively. FIG. 17A illustrates state transition from a state before reception of a print job and in which the handheld printer 10 is "floating" as described with reference to (b) in FIG. 12.

In a state S17a-1 (no data) before the handheld printer 10 receives a print job, the controller 14 does not execute any processing and the state does not change even though no operation is performed for a certain period in the handheld printer 10, a print start trigger occurs, or user operation is performed. When the handheld printer 10 receives a print job in the state S17a-1 (no data), the state transitions to a state S17a-2 (data present). However, the floating is detected. Accordingly, even though the handheld printer 10 performs no operation for a certain period, the print start trigger occurs, or user operation is performed, the controller 14 does not execute any processing and the state does not change similar to the state before reception of a print job. When the floating is resolved and the sheet (e.g., paper) is detected in the state S17a-2 (data present), the state transitions to a state S17a-3 (data present), and the heater circuit 204 turns on the preheater. In the state S17a-3 (data present), when the temperature reaches the reload notification temperature described with reference to FIG. 16, the handheld printer 10 issues a notification to the user. For example, the notification to the user can be turning on or blinking of the LED (for state indication) of the OPU 18 of the handheld printer 10. Alternatively, the handheld printer 10 can include a buzzer or the like to emit a sound for the notification. Yet alternatively, the notification can be an indication on the screen of the smart device that transmits the image data to the handheld printer 10. Thus, the OPU 18 serves as a notification device. As the notification completes, the user can recognize that the handheld printer 10 is capable of being operated. When floating is detected in the state S17a-3 (data present), the state transitions to the state S17a-2 (data present), and the heater circuit 204 turns off the preheater. When a user operation is performed in the state S17a-3 (data present), the state transitions to a state S17a-4 (data present), and the heater circuit 204 turns on the heater 203H. When floating is detected in the state S17a-4 (data present), the state transitions to the state S17a-2 (data present).

Note that, even in the state where the sheet is not detected at the time of receiving the print job, the preheater can be turned on because the head temperature is not raised to a temperature dangerous for the user. In other words, in the state S17a-2 (data present), the heater circuit 204 can turn on the preheater.

FIG. 17B illustrates state transition from a state without the "floating" illustrated in (b) in FIG. 12 before reception of a print job. In a state S17b-1 (no data) before the handheld printer 10 receives a print job, no processing is executed even though the handheld printer 10 performs no operation for a certain period, a print start trigger occurs, or user operation is performed. When the handheld printer 10 receives a print job in the state S17b-1 (no data), the state transitions to a state S17b-2 (data present), and the heater circuit 204 turns on the preheater. In the state S17b-2 (data present), when the temperature reaches the reload notification temperature described with reference to FIG. 16, the handheld printer 10 issues a notification to the user. Similar to the state S7a-3, for example, the notification to the user can be turning on or blinking of the LED (for state indication) of the handheld printer 10 or a sound by a buzzer or the like of the handheld printer 10. Alternatively, the notification can be an indication on the screen of the smart device to which the handheld printer 10 is connected. As the notification completes, the user can recognize that the handheld printer 10 is capable of being operated. When the handheld printer 10 performs no operation for a certain period in the state SI 7b-2 (data present), the state transitions to a state S17b-3 (data present), and the heater circuit 204 turns off the preheater. When user operation is performed in the state S17b-2 (data present), the state transitions to a state S17b-4 (data present), and the heater circuit 204 turns on the heater 203H. Additionally, when user operation is performed in the state S17b-3 (data present), the state transitions to the state S17b-4 (data present), and the heater circuit 204 turns on the heater 203H. When no operation is performed for the certain period in the state S17b-4 (data present), the state transitions to the state S17b-3 (data present), and the heater circuit 204 turns off the heater 203H.

FIG. 18 is a diagram illustrating state transition relating to the heater and preheater control from a state in which a print job is received in one embodiment of the present disclosure. "PREHEAT" or "HEAT" in FIG. 18 corresponds turning on the preheater or turning on the heater by the heater circuit 204 respectively. FIG. 18 illustrates the state transition from the state in which: the print job is already received; the "floating" illustrated in FIG. 12 is not detected; and user operation is performed.

In a state S18-1 (data present) after the handheld printer 10 has received the print job, the heater 203H has been on. Even when user operation is performed in the state S18-1 (data present), the controller 14 does not execute any processing, and the state does not change. When a print start trigger occurs, the state transitions to a state S18-2 (printing). In the state S18-2 (printing), even though the print start trigger occurs, the state is unchanged and printing is continued. Additionally, in a case where floating is detected in the state S18-2 (printing), the state transitions to a state S18-3 (no data) to finish the printing, and the heater circuit 204 turns off the heater 203H. The state S18-3 is the same as the state S17a-1 (no data) with the floating illustrated in FIG. 13A. Additionally, in a case where the print finish trigger occurs or no operation is performed for the certain period in a state S18-2 (printing), the state transitions to a state S18-4 (no data) to finish the printing, and the heater circuit 204 turns off the heater 203H. The state S18-4 is the same as the state S17b-1 (no data) without the floating illustrated in FIG. 17B.

Figures 19, 19A:
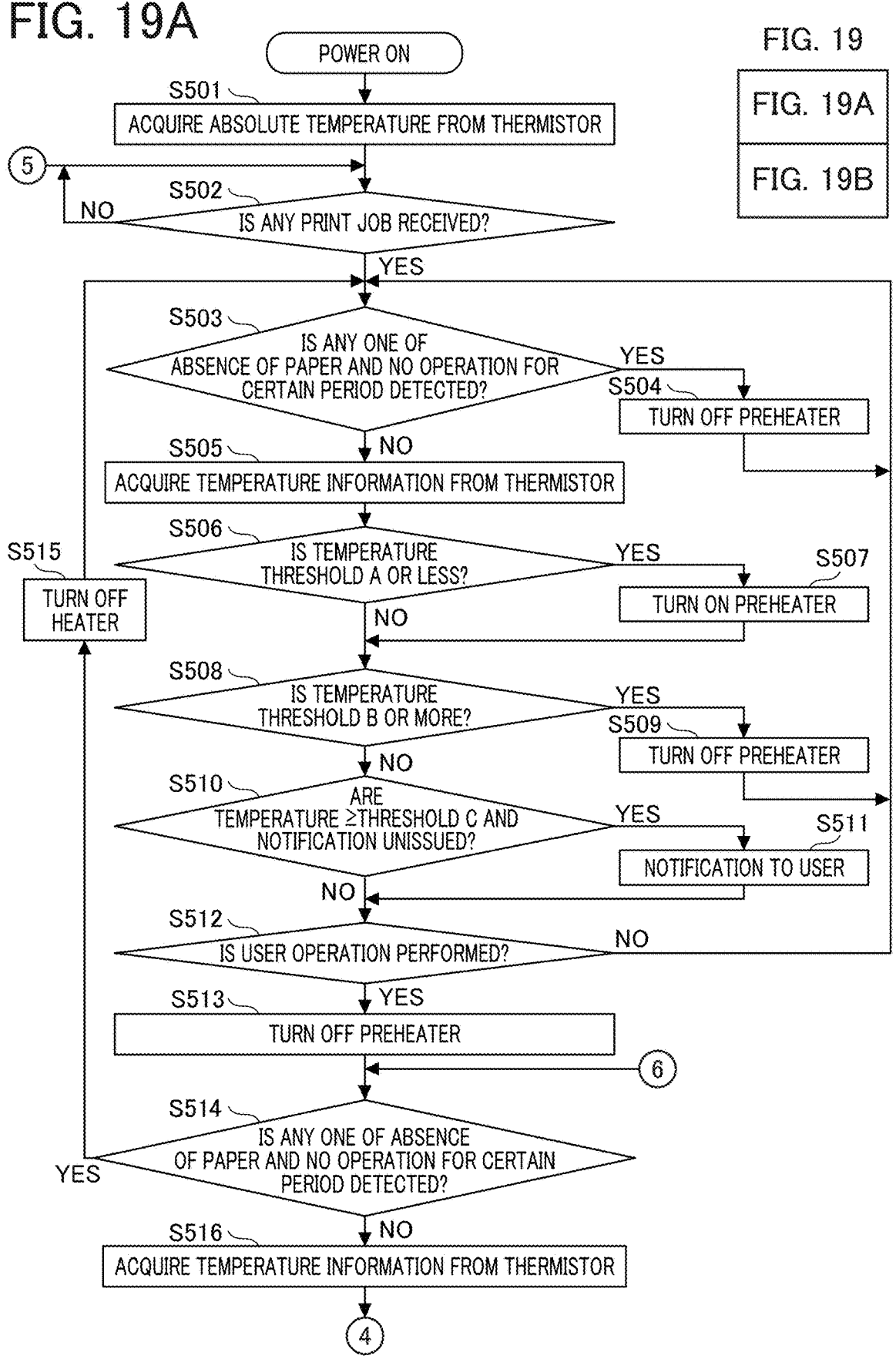
FIGS. 19A and 19B (FIG. 19) is a flowchart illustrating exemplary heater and preheater control, according to one embodiment.
Figure 19B:
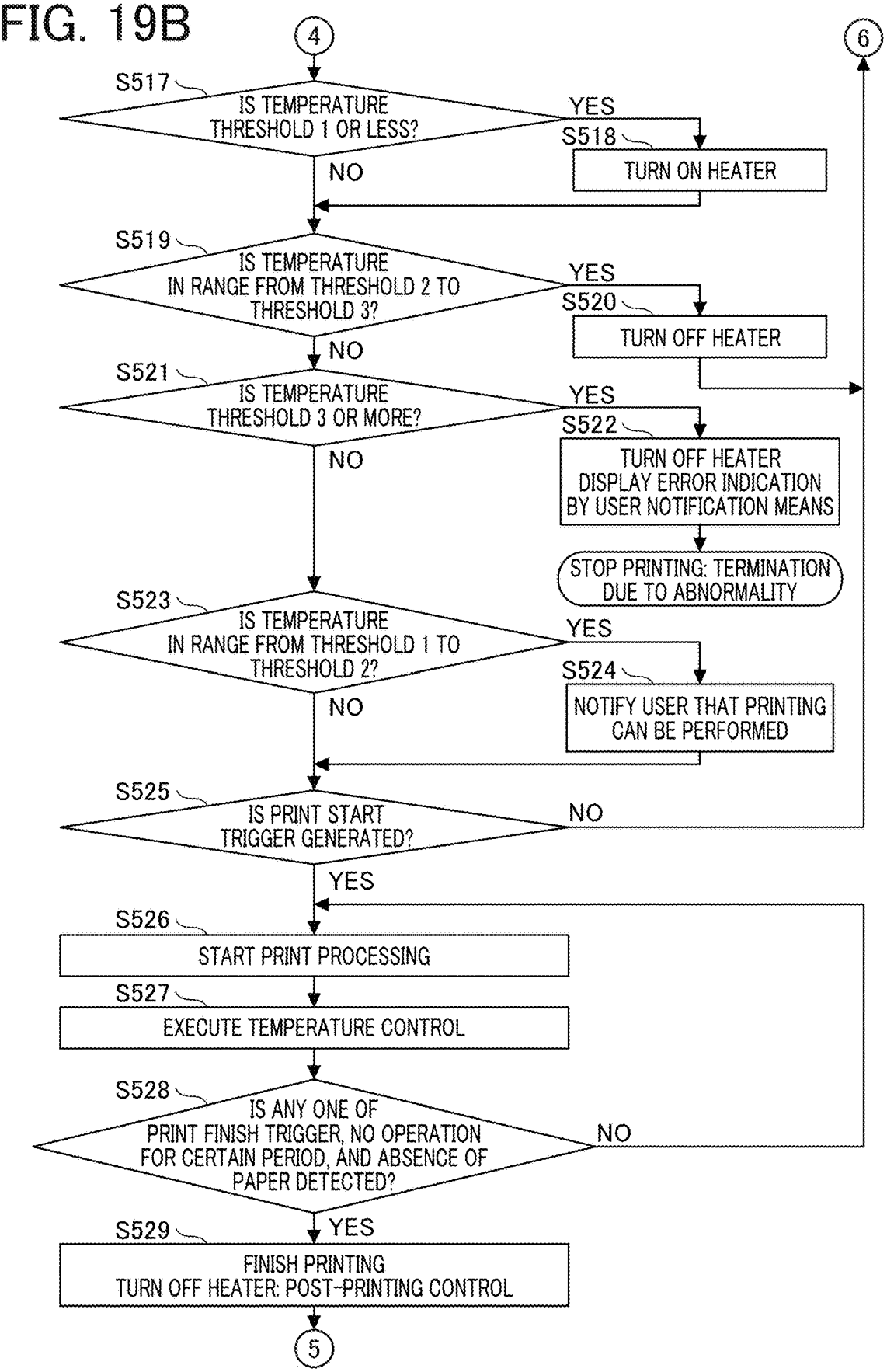

FIG. 19 is a flowchart illustrating exemplary heater and preheater control in one embodiment of the present disclosure. S503 to S511 in which the preheater control is performed will be described. Operations in S501, S502, and S514 to S529 are similar to the heater control illustrated in FIG. 15. The threshold A and threshold B illustrated in FIG. 16 are used for description.

In S503, the controller 14 determines whether absence of the sheet is detected or no operation for the certain period is detected. In a case where the determination is YES, the processing proceeds to S504, and in a case of NO, the processing proceeds to S505. In S504, the preheater is turned off, and the processing returns to S503. In S505, the controller 14 acquires temperature information from the thermistor 202 and uses the temperature information to determine the head temperature. The temperature information can be information indicating a temperature difference.

Subsequently, in a case where the acquired temperature is equal to or lower than the threshold A (YES in S506), the heater 203H is turned on (S507), and the processing proceeds to S508. When the acquired temperature is higher than the threshold A (NO in S506), the processing proceeds to S508.

Subsequently, in a case where the acquired temperature is equal to or higher than he threshold B (YES in S508), the preheater is turned off (S509), and the processing proceeds to S503. When the acquired temperature is lower than the threshold B (NO in S508), the processing proceeds to S510.

At S510, when the acquired temperature is equal to or higher than the threshold C and the notification to the user is unissued (Yes in S510), the controller 14 issues the notification to the user at S511. Then, the processing proceeds to S512. Here, the user is notified that the handheld printer 10 is capable of being operated as described with reference to FIGS. 17A and 17B. When the acquired temperature is lower than the threshold C or the notification has already been given to the user (No in S510), the processing proceeds to S512.

In S512, in a case where user operation is not detected, the processing returns to S503. In a case where user operation is detected, the processing proceeds to S513, and the preheater is turned off. In steps starting at S514, the heater control is performed. FIGS. 20A and 20B are diagrams illustrating state transition relating to the heater control from before reception of a print job in one embodiment of the present disclosure, in which user operation is a trigger. "HEAT" in FIG. 20 corresponds to turning on the heater by the heater circuit 204. FIG. 20A illustrates the state transition from the state before reception of a print job and the liquid discharge apparatus (handheld printer) is "floating" illustrated in (b) in FIG. 12. In FIG. 20, the preheater control is not performed.

In a state S20a-1 (no data) before the handheld printer 10 receives a print job, the controller 14 does not execute any processing and the state does not change even though no operation is performed for a certain period in the handheld printer 10, a print start trigger occurs, or user operation is performed. When the handheld printer 10 receives a print job in the state S20a-1 (no data), the state transitions to a state S20a-2 (data present). However, the floating is detected. Accordingly, the controller 14 does not execute any processing and the state does not change similar to the state before reception of a print job even though the handheld printer 10 performs no operation for a certain period or a print start trigger occurs.

When the floating is resolved and the sheet is detected in the state S20a-2 (data present), the state transitions to the state S20a-3 (data present). In the state S20a-3 (data present), the heater circuit 204 does not turn on the heater. When floating is detected in the state S20a-3 (data present), the state transits to the state S20a-2 (data present). Additionally, when user operation is performed in the state S20a-3 (data present), the state transitions to a state S20a-4 (data present), and the heater circuit 204 turns on the heater 203H. When floating is detected in the state S20a-4 (data present), the state transitions to the state S20a-2 (data present), and the heater circuit 204 turns off the heater 203H.

FIG. 20B illustrates the state transition from the state without the "floating" illustrated in (b) in FIG. 12 before reception of a print job. In a state S20b-1 (no data) before the handheld printer 10 receives a print job, the controller 14 does not execute any processing and the state does not change even though the handheld printer 10 performs no operation for a certain period, a print start trigger occurs, or user operation is performed. In the state S20b-1 (no data), when the handheld printer 10 receives a print job, the state transitions to a state S20b-2 (data present). Even when the handheld printer 10 performs no operation for a certain period in the state S20b-2 (data present), no processing is executed, and the state does not change. When user operation is performed in the state S20b-2 (data present), the state transitions to a state S20b-3 (data present), and the heater circuit 204 turns on the heater 203H. When no operation is performed for the certain period in the state S20b-3 (data present), the state transitions to the state S20b-2 (data present), and the heater circuit 204 turns off the heater 203H.

As described above, since the heater control is not performed until user operation to actually start printing is performed, the user has a reduced opportunity to erroneously touch the exposed, hot head, and the safety is improved.

Figure 21:
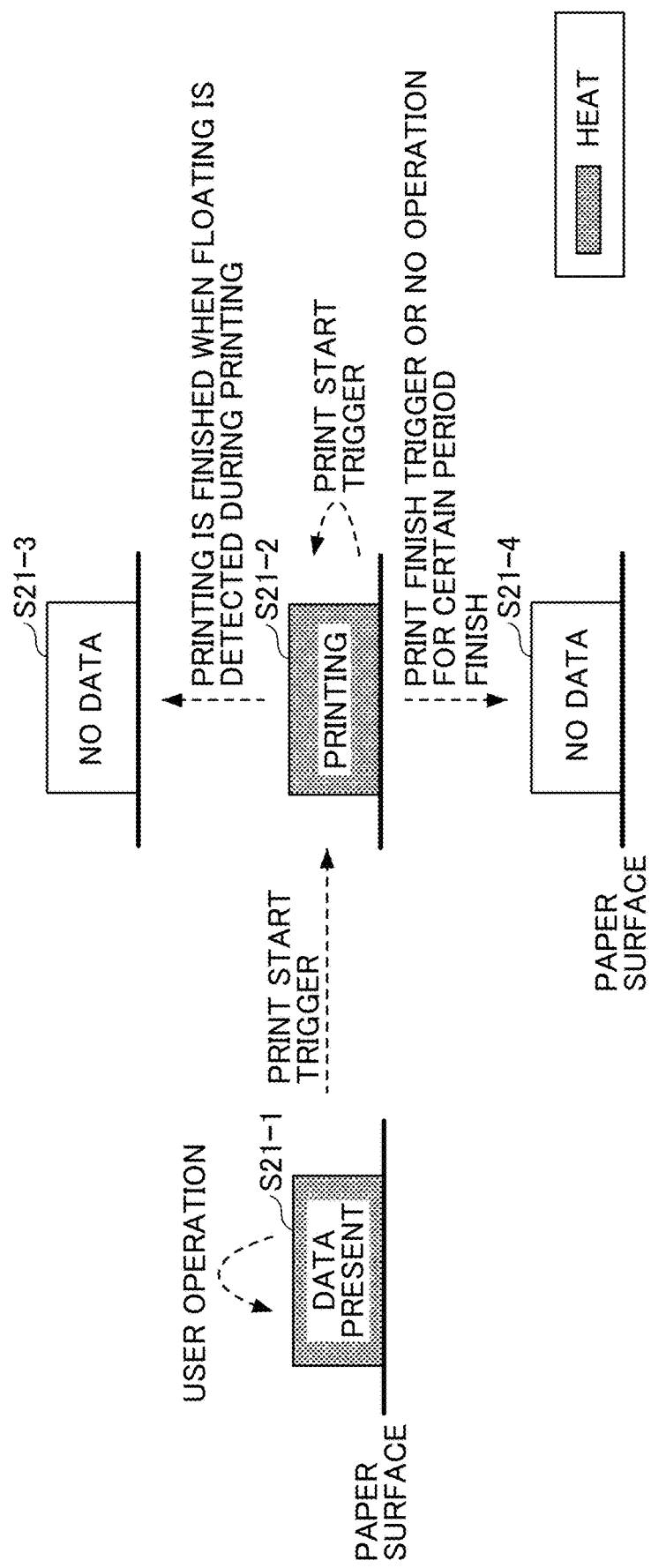
FIG. 21 is a diagram illustrating state transition relating to heater control from a state in which a print job is received, according to one embodiment, in which user operation is used as a trigger.

FIG. 21 is a diagram illustrating state transition relating to the heater control from a state in which a print job is received in one embodiment of the present disclosure, in which user operation is a trigger. "HEAT" in FIG. 21 corresponds to turning on the heater by the heater circuit 204. FIG. 21 illustrates the state transition from a state in which: the print job is already received; the "floating" illustrated in (b) in FIG. 12 is not detected; and user operation is performed.

In a state S21-1 (data present) after the handheld printer 10 has received the print job, the heater 203H has been on because user operation is already performed. Furthermore, in the state S21-1 (data present), the state does not change even though user operation is performed. When a print start trigger occurs in the state S21-1 (data present), the state transitions to a state S21-2 (printing). In the state S21-2 (printing), even though the print start trigger occurs, the state is unchanged, and printing is continued. Additionally, in a case where floating is detected in the state S21-2 (printing), the state transitions to a state S21-3 (no data) to finish the printing, and the heater circuit 204 turns off the heater 203H. The state S21-3 is the same as the state S20a-1 (no data) with the floating illustrated in FIG. 20A. Additionally, in a case where the print finish trigger occurs or no operation is performed for the certain period in the state S21-2 (printing), the state transitions to a state S21-4 (no data) to finish the printing, and the heater circuit 204 turns off the heater 203H. The state S21-4 is the same as the state S20b-1 (no data) without the floating illustrated in FIG. 20B.

As described above, in one aspect of the present disclosure, printing is performed after the print head is heated by the heater control to a recommended printable temperature. Accordingly, print quality can improve. Additionally, in the preheater control (first control stage), the print head temperature is prevented from becoming too hot. Accordingly, even if a user touches the handheld printer immediately after picking up the handheld printer, the safety of the user is ensured. Furthermore, since the time to reach the target temperature is shortened by the preheater control, the time from user operation to start of printing can be shortened. Since user operation is used as a trigger to determine start of the heater control (second control stage), the heater control is not performed until the user operation to actually start printing is performed. Therefore, the user has a reduced opportunity to erroneously touch the exposed head in a high temperature state, and the safety is improved. In other words, the safety can improve in the case of controlling the temperature of the head portion of the handheld printer.

In the present disclosure, the handheld printer 10 is an example of a liquid discharge apparatus. The inkjet recording head 19 is an example of a head. The DMAC (CACHE) 105 and the inkjet recording head control unit 111 are examples of a discharge control unit. The navigation sensor 30 and the gyro sensor 20 are examples of sensors. The controller 14 is an example of a float detecting unit, a heater control unit, a standby time detecting unit, and a report unit. The preheater control is an example of first control stage. The heater control is an example of second control stage.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A liquid discharge apparatus to discharge liquid onto a recording medium while being moved by a user, the liquid discharge apparatus comprising:
    a head configured to discharge liquid to print an image on the recording medium according to image data;
    a sensor configured to detect movement of the liquid discharge apparatus in a predetermined period and output movement information of the liquid discharge apparatus, the movement information including at least one of a movement amount and an angular velocity;
    a heater configured to heat the head;
    a temperature sensor configured to detect a temperature of the head; and
    circuitry configured to:
        instruct liquid discharge from the head based on the image data and the movement information from the sensor;
        detect floating of the liquid discharge apparatus based on a detection result generated by the sensor; and
        control heating of the head based on a result of detection of the floating.

2. The liquid discharge apparatus according to claim 1, wherein the circuitry is configured to detect a user operation and an occurrence of standby time based on the movement information from the sensor, the standby time in which the user operation is not performed, and wherein the circuitry is configured to control the heating of the head based on a detection of the user operation and the occurrence of standby time.

3. The liquid discharge apparatus according to claim 2, wherein the circuitry is configured to start the heating of the head in response to a detection of the user operation.

4. The liquid discharge apparatus according to claim 1, wherein the circuitry is configured to stop the heating of the head in response to a detection of the floating.

5. The liquid discharge apparatus according to claim 1, wherein the circuitry is configured to control the heating of the head in a first control stage with a first target temperature and a second control stage with a second target temperature different from the first target temperature.

6. The liquid discharge apparatus according to claim 5, wherein the first target temperature is lower than the second target temperature, and
    wherein the circuitry is configured to execute the first control stage prior to the second control stage.

7. The liquid discharge apparatus according to claim 6, further comprising a notification device configured to issue a notification to notify a user of an operable state of the liquid discharge apparatus in response to a detection that the temperature of the head has reached the first target temperature during the first control stage of the circuitry.

8. The liquid discharge apparatus according to claim 7, wherein the notification includes at least one of light emitting diode lighting, light emitting diode blinking, buzzer sound, and an indication on a display of a device from which the image data is transmitted.

9. A liquid discharge apparatus to discharge liquid onto a recording medium while being moved by a user, the liquid discharge apparatus comprising:
    a head configured to discharge liquid to print an image on the recording medium according to image data;
    a sensor configured to detect movement of the liquid discharge apparatus in a predetermined period and output movement information of the liquid discharge apparatus, the movement information including at least one of a movement amount and an angular velocity of the liquid discharge apparatus;
    a heater configured to heat the head;
    a temperature sensor configured to detect a temperature of the head; and
    circuitry configured to:
        instruct liquid discharge from the head based on the image data and the movement information from the sensor;
        detect a user operation and an occurrence of standby time based on the movement information from the sensor, the standby time in which the user operation is not performed; and
        control heating of the head based on a detection of the user operation and the occurrence of standby time.

10. The liquid discharge apparatus according to claim 9, wherein the circuitry is configured to start the heating of the head in response to a detection of the user operation.

11. A liquid discharge method executed by a liquid discharge apparatus to discharge liquid onto a recording medium while being moved by a user, the method comprising:
    discharging liquid, with a head, to form an image on the recording medium according to image data
    detecting, with a sensor, movement of the liquid discharge apparatus in a predetermined period to output movement information of the liquid discharge apparatus, the movement information including at least one of a movement amount and an angular velocity;
    heating the head;
    detecting a temperature of the head;
    instructing liquid discharge based on the image data and the movement information;
    detecting floating of the liquid discharge apparatus based on a detection result generated by the sensor; and controlling the heating of the head based on a result of the detecting the floating.

12. The method according to claim 11, further comprising:
    detecting a user operation and determining an occurrence of standby time in which the user operation is not performed; and
    controlling the heating of the head based on a result of the detecting the user operation and the occurrence of standby time.

* * * * *